(12) United States Patent
Morarity et al.

(10) Patent No.: US 10,061,441 B2
(45) Date of Patent: Aug. 28, 2018

(54) TOUCH INTERACTIVITY WITH OCCLUSIONS IN RETURNED ILLUMINATION DATA

(71) Applicant: Microvision, Inc., Redmond, WA (US)

(72) Inventors: Jonathan A. Morarity, Seattle, WA (US); Patrick J. McVittie, Seattle, WA (US); P. Selvan Viswanathan, Bellevue, WA (US); Ru Chen, Bellevue, WA (US); Justin R. Zilke, Kirkland, WA (US)

(73) Assignee: Microvision, Inc., Redmond, WA (US)

(*) Notice: Subject to any disclaimer, the term of this patent is extended or adjusted under 35 U.S.C. 154(b) by 3 days.

(21) Appl. No.: 15/390,927

(22) Filed: Dec. 27, 2016

(65) Prior Publication Data
US 2018/0181259 A1    Jun. 28, 2018

(51) Int. Cl.
*G06F 3/042*    (2006.01)
*G06F 3/041*    (2006.01)

(52) U.S. Cl.
CPC .......... *G06F 3/0421* (2013.01); *G06F 3/0416* (2013.01); *G06F 2203/04108* (2013.01)

(58) Field of Classification Search
CPC .... G06F 3/0421; G06F 3/0425; G06F 3/0416; G06F 2203/04108
See application file for complete search history.

(56) References Cited

U.S. PATENT DOCUMENTS

| 8,497,841 B1 | 7/2013 | Sze | |
|---|---|---|---|
| 8,589,824 B2 | 11/2013 | Hillis et al. | |
| 2007/0201863 A1* | 8/2007 | Wilson | G03B 29/00 396/429 |
| 2008/0062149 A1* | 3/2008 | Baruk | G06F 3/0421 345/175 |
| 2009/0122295 A1 | 5/2009 | Eaton | |
| 2010/0053591 A1 | 3/2010 | Gibson et al. | |
| 2011/0291988 A1* | 12/2011 | Bamji | G06F 3/0428 345/175 |
| 2012/0120029 A1* | 5/2012 | McCarthy | G06F 3/0421 345/175 |
| 2012/0194479 A1* | 8/2012 | Stark | G06F 3/0428 345/175 |
| 2012/0319945 A1* | 12/2012 | McCarthy | G06F 3/017 345/156 |
| 2013/0107000 A1* | 5/2013 | Xue | G01S 17/023 348/46 |
| 2013/0182897 A1* | 7/2013 | Holz | G06K 9/00711 382/103 |

(Continued)

OTHER PUBLICATIONS

Deng, et al., "Kinect Shadow Detection and Classification", 2013 IEEE Conference on Computer Vision Workshops, Dec. 2, 2013.

(Continued)

*Primary Examiner* — Ibrahim A Khan
(74) *Attorney, Agent, or Firm* — Kevin D. Wills

(57) ABSTRACT

A projection system emits light pulses in a field of view and measures properties of reflections. Properties may include time of flight and return amplitude. Foreground objects and background surfaces are distinguished, distances between foreground objects and background surfaces are determined based on reflections that are occluded by the foreground objects and other properties of the projection system.

26 Claims, 25 Drawing Sheets

(56) References Cited

U.S. PATENT DOCUMENTS

| | | | | |
|---|---|---|---|---|
| 2013/0182987 A1* | 7/2013 | Himeno | ................ | C08G 73/10 |
| | | | | 384/523 |
| 2013/0229396 A1* | 9/2013 | Huebner | ............. | H04N 9/3147 |
| | | | | 345/207 |
| 2013/0249790 A1* | 9/2013 | Takasu | .................... | G06F 3/017 |
| | | | | 345/156 |
| 2013/0257748 A1* | 10/2013 | Ambrus | ............ | G02B 27/0093 |
| | | | | 345/173 |
| 2013/0265218 A1* | 10/2013 | Moscarillo | ............. | G06F 3/017 |
| | | | | 345/156 |
| 2013/0307773 A1* | 11/2013 | Yagishita | ............. | G06F 3/0304 |
| | | | | 345/158 |
| 2014/0232695 A1* | 8/2014 | McGaughan | ........ | G06F 3/0426 |
| | | | | 345/175 |
| 2015/0049063 A1* | 2/2015 | Smith | ................... | G06F 3/0421 |
| | | | | 345/175 |
| 2015/0293600 A1* | 10/2015 | Sears | ..................... | G06F 3/017 |
| | | | | 345/156 |
| 2016/0041266 A1 | 2/2016 | Smits | | |
| 2016/0231862 A1* | 8/2016 | Tretter | ................ | G06F 3/0416 |

OTHER PUBLICATIONS

Raju, et al., "Shadow Analysis Technique for Extraction of Building Height Using High Resolution Satellite Single Image and Accuracy Assessment", The International Archives of the Photogrammetry, Remote Sensing and Spatial Information Sciences, vol. XL-8, 2014, Dec. 9, 2014, 1185-1192

Microvision, Inc. "Search Report and Written Opinion", PCT/US17/066065 Search Report and Written Opinion, dated Feb. 22, 2018.

* cited by examiner

TOUCH INTERACTIVITY WITH OCCLUSIONS IN RETURNED ILLUMINATION DATA

FIELD

The present invention relates generally to projection and three dimensional (3D) measurement systems, and more specifically to touch and gesture recognition.

BACKGROUND

Various methods and apparatus have been proposed to allow user interaction with projected content. For example, U.S. Pat. No. 8,497,841 "SYSTEM AND METHOD FOR A VIRTUAL KEYBOARD" issued to Sze et al. (hereafter referred to as "Sze") discloses an infrared (IR) light plane projected just above and parallel to a projection surface. The apparatus disclosed by Sze detects objects when they break the IR light plane, so they are only detected when very near that plane. Mid-air gestures are not recognized because they are above the IR light plane. Furthermore, the apparatus of Sze is sensitive to anomalies in the projection surface that could break or distort the IR light plane.

Optical time-of-flight (ToF) measurement is a proven method of range sensing that works by measuring the flight time of an emitted light signal which reflects off a point in the field of view. Pulses of light can be scanned out in a two dimensional pattern and collected into a point cloud that represents distance to objects in the scanned field. See e.g., US 2013/0107000 "SCANNING LASER TIME OF FLIGHT 3D IMAGING" by Xue et al.

ToF provides an appealingly compact solution for medium-long range depth imaging, but is limited in resolution at close distances due to limitations in the electronic circuitry to accurately and inexpensively measure short time scales and compensate for changes in the returned pulse amplitude.

DESCRIPTION OF EMBODIMENTS

Figure 1:
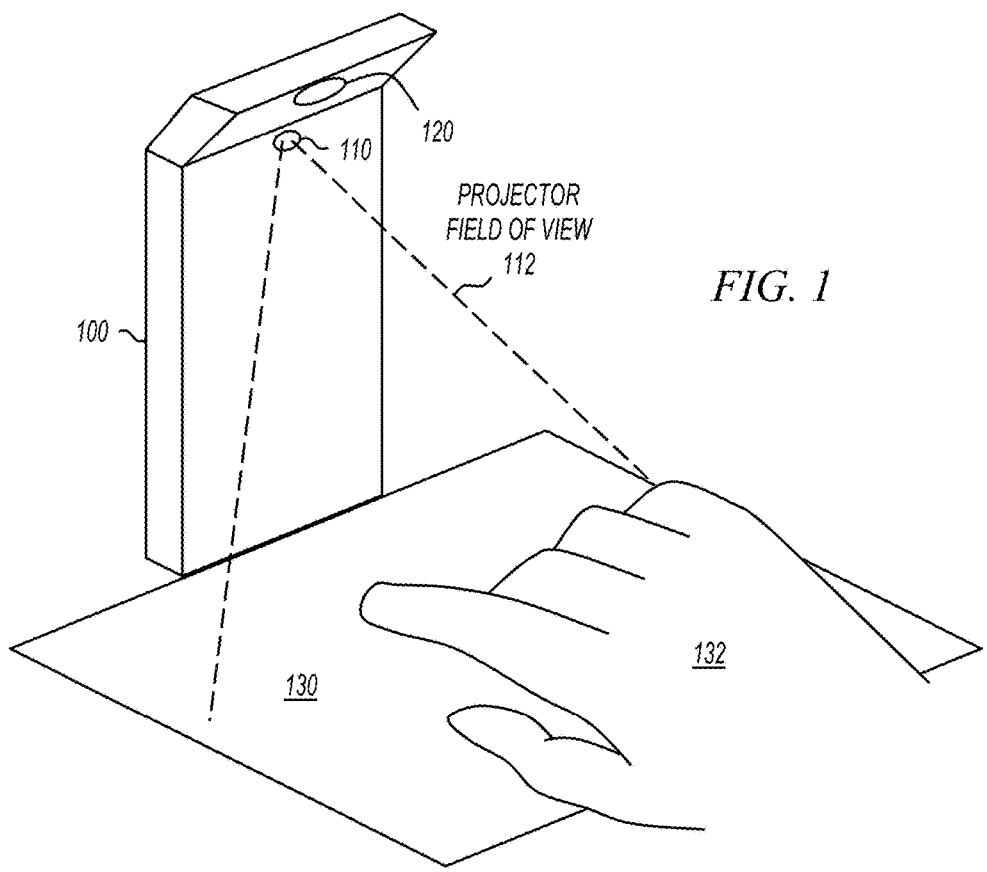
FIGS. 1 and 2 show a foreground object causing an occlusion in the field of view of a projection apparatus in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
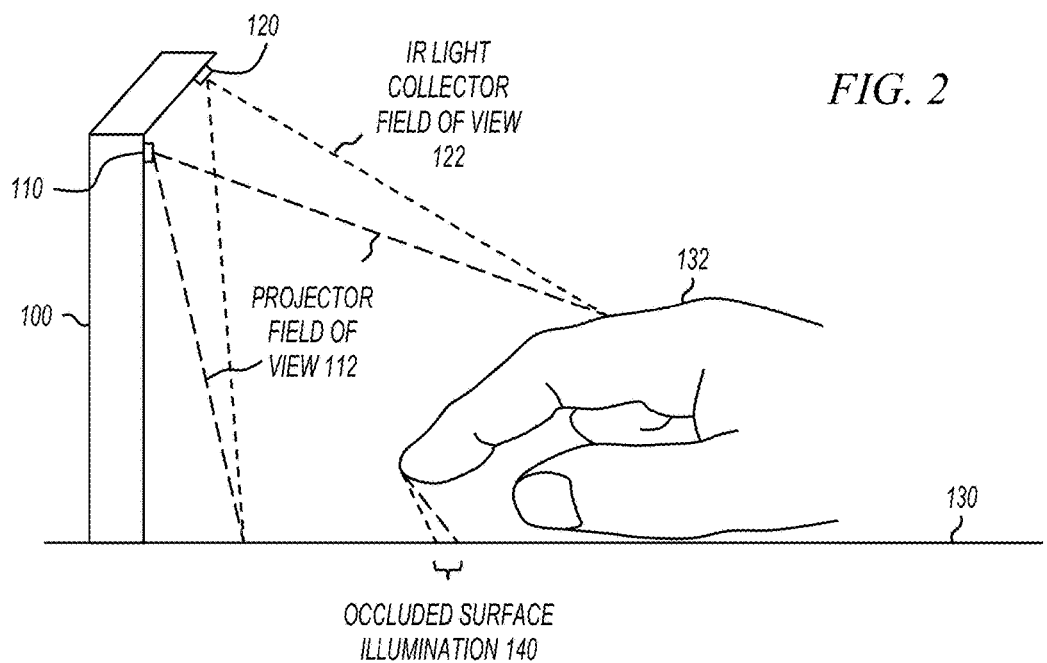

FIGS. 1 and 2 show a foreground object causing an occlusion in the field of view of a projection apparatus in accordance with various embodiments of the present invention. FIGS. 1 and 2 show projection apparatus 100 having transmitter (TX) 110 and receiver (RX) 120. Transmitter 110 projects light into field of view 112. The light is projected toward projection surface 130 (also referred to herein as a "background surface"). The projected light also falls on any foreground objects in the field of view 112. One such foreground object is shown as human hand 132.

Receiver 120 includes a light detector (not shown) that receives and detects light that is reflected off objects in its field of view. For example, receiver 120 may receive light that is reflected off surface 130 and hand 132 within field of view 122. Data that represents the received light reflections is referred to herein as "returned illumination data." When transmitter 110 and receiver 120 are not co-located, a positional disparity exists that causes some projected light to not be received by receiver 120 after reflection. This is illustrated by occluded surface illumination 140. The size of occluded surface illumination 140 is directly related to the positional disparity between transmitter 110 and receiver 120, and the height of the occluding foreground object (e.g., hand 132) above surface 130. Various embodiments of the present invention utilize the size and position of occluded surface illumination 140 along with information describing the positional disparity of the TX/RX to determine the height above the surface of the occluding foreground object. This is referred to herein as "occlusion-based height estimation."

Projection apparatus 100 may project any type of content. For example, in some embodiments, projection apparatus 100 projects a combination of visible light and nonvisible light, and in other embodiments, projection apparatus 100 only projects either visible or nonvisible light. In some embodiments, projection apparatus 100 displays still images, and in other embodiments, projection apparatus 100 displays video. Accordingly, some embodiments project visible light to produce images and video while also projecting nonvisible light, such as infrared (IR) light, to gather returned illumination data useful for occlusion-based height estimation. Other embodiments project only nonvisible light to gather returned illumination data useful for occlusion-based height estimation.

Projection apparatus 100 may be a stand-alone projector, or may be another device that includes a projector. For example, in some embodiments, projection apparatus may be included within a mobile device, such as a tablet or smartphone, and in other embodiments, projection apparatus may be included within a computer or gaming device. Projection apparatus 100 may include any additional functionality without departing from the scope of the present invention.

Projection apparatus 100 may include any type of transmitter 110. For example, in some embodiments, transmitter 110 may include a scanning laser projector. Similarly, receiver 120 may include any type of light detector without departing from the scope of the present invention. For example, in some embodiments, receiver 120 includes a single photodetector, and in other embodiments receiver 120 includes an imager with multiple light sensors.

Figure 3:
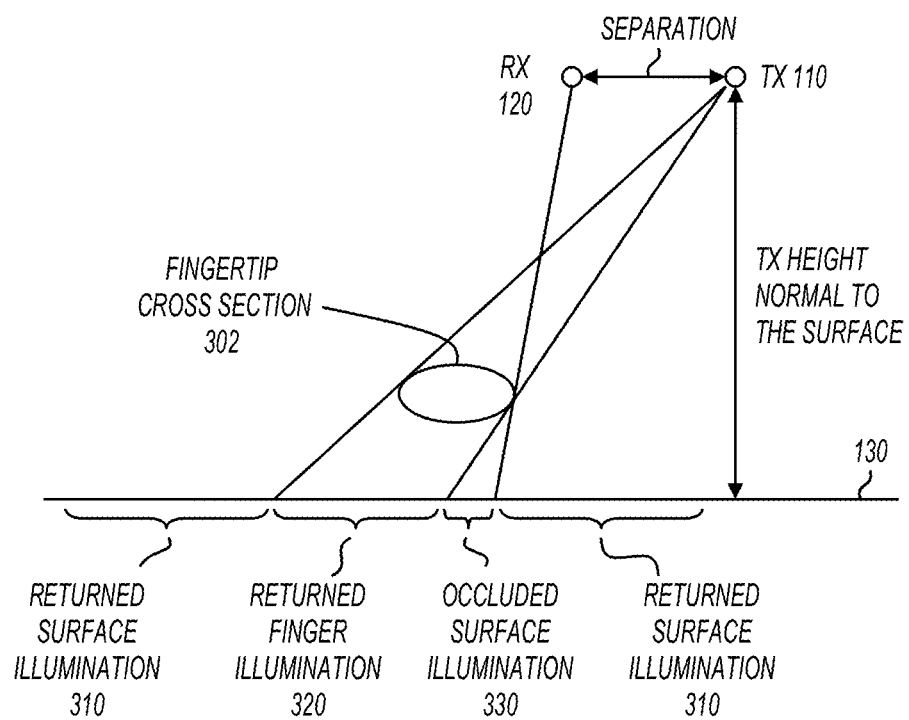
FIG. 3 shows illumination of a background surface and a foreground object with respect to transmitter/receiver disparity in accordance with various embodiments of the present invention.

FIG. 3 shows illumination of a background surface and a foreground object with respect to transmitter/receiver disparity in accordance with various embodiments of the present invention. The background surface may be a tabletop, floor, ceiling, wall, or any other object encompassing the field of view. The example configuration of FIG. 3 shows a positional disparity between transmitter 110 and receiver 120 along the horizontal (x) axis with no disparity in the vertical (z) axis. A finger is shown in the field of view with the fingertip cross section 302 suspended above the surface 130. The finger in FIG. 3 is at roughly 90 degrees to the finger in FIGS. 1 and 2 with respect to the TX/RX disparity.

In some embodiments, transmitter 110 emits IR light pulses in a 2D pattern, and the IR light pulses are captured by receiver 120 at its perspective angle to form a 2D image surface projection as shown in FIG. 3. Light pulses that reach the surface at areas 310 are reflected and detected at receiver 120. Accordingly, returned illumination data includes data representing returned surface illumination 310. Similarly, light pulses that reach the top of the finger are also reflected and detected at receiver 120. This is shown by returned finger illumination 320. Light pulses that reach surface 130 at region 330 are reflected but do not reach receiver 120 due to positional disparity between transmitter 110 and receiver 120, and the height of finger 302 above surface 130. This results in occluded surface illumination 330. The area of occluded surface illumination 330 is also referred to herein as an "occlusion region." The term "illumination" as used here is intended to refer to the false color rendering of the returned TOF ADC code used to visualize the field of view.

When reflected light reaches receiver 120, various different quantities may be measured to create the returned illumination data. For example, in some embodiments, a ToF may be measured, and in other embodiments, a received amplitude may be measured. In still further embodiments, ToF and amplitude may both be measured and combined to generate the returned illumination data.

The returned illumination data may include large errors with respect to the measured quantity. For example, ToF measurements can be highly amplitude dependent and reflectance variations can significantly distort the measured ToF. Similarly, amplitude measurements can also be significantly distorted by reflectance variations with the field of view. These distortions notwithstanding, various embodiments of the present invention can use the returned illumination data to determine the location and size of occluded regions, and then use the occlusion data to determine the height above the background surface with greater accuracy.

The occlusion-based height estimation described herein may be used to distinguish between a true contact and a hover down to a few millimeters, even with returned illumination data with very large accuracy error with respect to the measured quantity. This is made possible by combining 2D planar (x, y) image processing techniques with z-axis triangulation using surface occlusion information made possible by positional disparity between transmitter and receiver.

Figure 4:
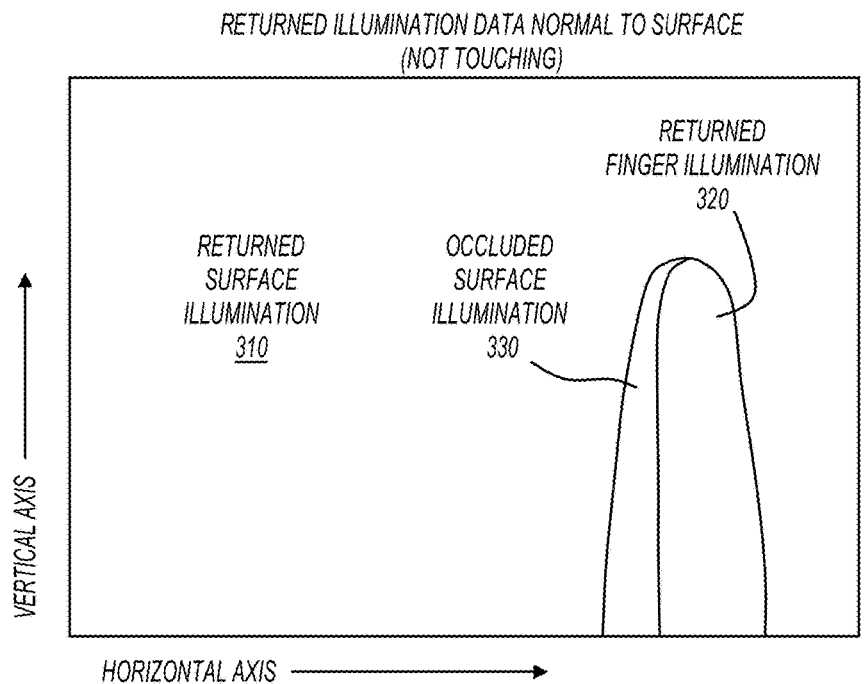
FIGS. 4 and 5 show 2D representations of returned illumination data in accordance with various embodiments of the present invention.
Figure 5:
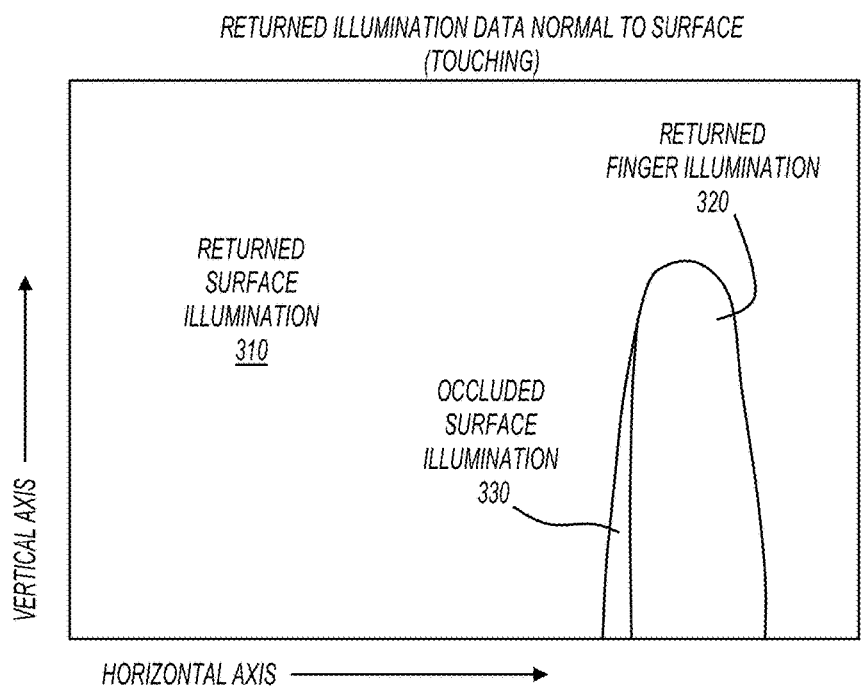

FIGS. 4 and 5 show 2D representations of returned illumination data in accordance with various embodiments of the present invention. The 2D representations shown in FIGS. 4 and 5 show regions that include discrete points (not shown) of returned illumination data. For example, in a scanning mirror embodiment, light pulses are emitted at individual points in the field of view corresponding to different mirror angles, and these light pulses are received and measured, or are occluded. This results in a point cloud of individual measurements within the field of view. Rather than showing each individual point within the field of view, FIGS. 4 and 5 show the different regions represented by the returned illumination data. The regions include the returned surface illumination 310, the returned finger illumination 320, and the occlusion region shown as occluded surface illumination 330.

FIG. 4 shows a wider occlusion region at occluded surface illumination 330 than does FIG. 5. This is because FIG. 4 represents foreground object (e.g., a finger) above the background surface, whereas FIG. 5 represents the same foreground object touching the background surface. As the fingertip is lowered to touch the background surface, the width of the occlusion region decreases toward zero, providing the means by which to generate an accurate height estimate.

Note that in FIG. 5, while the width of the occlusion region is significantly large at the base of the finger, it narrows as the fingertip is approached and occlusion codes are mostly absent from the contoured fingertip area. This makes sense since the captured image corresponds to a touch event.

Figure 6:
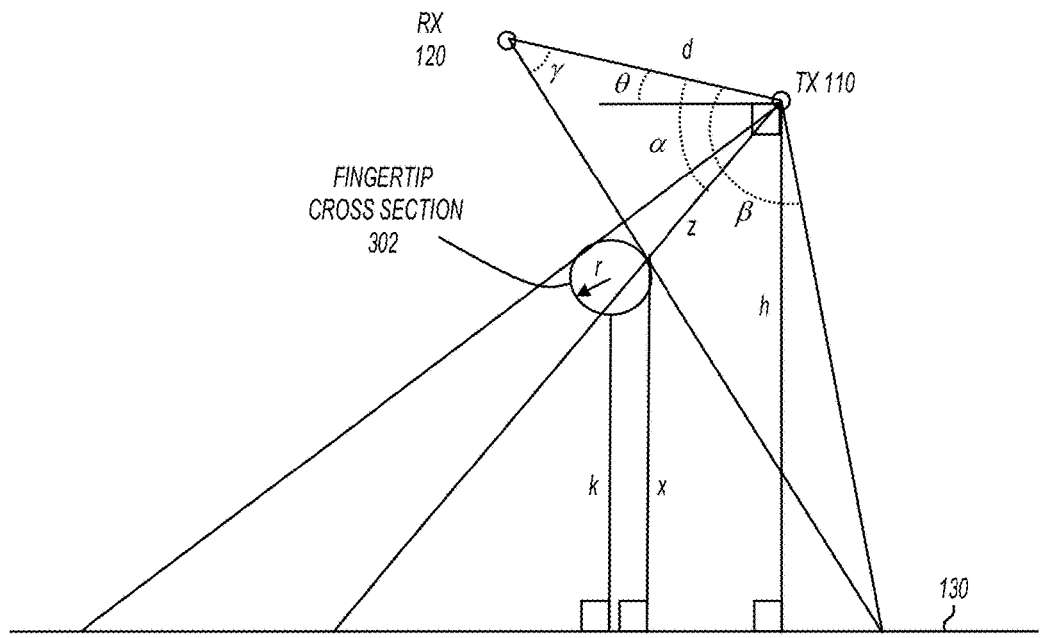
FIG. 6 shows geometry useful for occlusion-based height estimation in accordance with various embodiments of the present invention.

FIG. 6 shows geometry useful for occlusion-based height estimation in accordance with various embodiments of the present invention. The example configuration of FIG. 6 shows a positional disparity between transmitter 110 and receiver 120 along both the horizontal (x) axis and the vertical (z) axis. As shown in FIG. 6:

$\beta$ is the angle of the occlusion edge;
$\alpha$ is the angle of the finger edge;
$\theta$ is the angle of the projector to the background surface;
h is the height of the transmitter above the background surface;
d is the distance between the transmitter and the receiver; and
r is the radius of the finger.

Now, representing the depth from the TX/RX plane to the finger as z, and $\gamma$ being the intermediate variable as shown in FIG. 6, $\gamma$ is equal to $$\gamma = \tan^{-1}\left(\frac{h\sin(\beta)}{d\sin(\beta-\theta)-h\cos(\beta)}\right), \quad (1)$$

and z is equal to $$z = d\frac{\sin(\gamma)}{\sin(\gamma)\cos(\alpha)+\cos(\gamma)\sin(\alpha)}. \quad (2)$$

The height x is equal to $$x = h - z\sin(\alpha-\theta), \quad (3)$$

Combining (1) and (2) yields $$z = \frac{d\sin(\beta)}{\sin(\beta)\cos(\alpha) + \left(\frac{d}{h}\sin(\beta-\theta) - \cos(\beta)\right)\sin(\alpha)}, \quad (4)$$

and combining (3) and (4) yields $$x = h - \frac{d\sin(\beta)\sin(\alpha-\theta)}{\sin(\beta)\cos(\alpha) + \left(\frac{d}{h}\sin(\beta-\theta) - \cos(\beta)\right)\sin(\alpha)}. \quad (5)$$

Finally, the height of the finger above surface 130 can be estimated as:

$$k = x - r - r\cos(\gamma+\theta). \quad (6)$$

As described above, one or more attributes of an occlusion region are used to estimate the distance between a foreground object and a background surface. For example, a width of the occlusion region is used, as are angles between the occlusion region and various other components in the system. The width of the occlusion region may be measured in a common dimension with a line formed between the light transmitter and the light receiver as shown in FIG. 6. Further, physical attributes of the system are also used to estimate the height. In some embodiments, distances and angles that describe the positional disparity of the transmitter and receiver may be used in the estimation. For example, the distance d between the transmitter and receiver may be used. Also for example, the angle θ between a line formed between the light transmitter and the light receiver and the background surface may be used.

Figure 7:
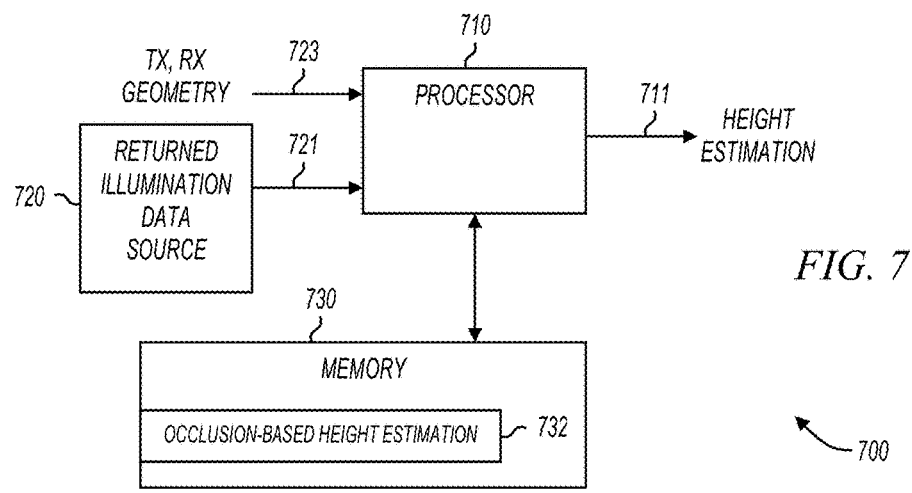
FIG. 7 shows a system useful for occlusion-based height estimation in accordance with various embodiments of the present invention.

FIG. 7 shows a system useful for occlusion-based height estimation in accordance with various embodiments of the present invention. System 700 includes processor 710, returned illumination data source 720, and memory 730. In operation, processor 710 receives returned illumination data at 721, and TX/RX geometry at 723, and provides one or more occlusion-based height estimates at 711.

Returned illumination data source 720 provides returned illumination data for one or more images to processor 710. For example, in some embodiments, returned illumination data source 720 includes a buffer that includes returned illumination data corresponding to one video frame. In other embodiments, returned illumination data source 720 includes circuits that measure ToF and/or amplitude of reflected light pulses, and provide the returned illumination data to processor 710 as it is measured.

Processor 710 may be any type of processor capable of executing instructions and performing mathematical calculations. For example, processor 710 may be a microprocessor, a digital signal processor, or the like. Memory 730 may be any type of memory capable of non-transitory storage of processor instructions. For example, memory 730 may a volatile or nonvolatile semiconductor storage device such as static random access memory or FLASH memory. Memory 730 may also include magnetic or optical storage.

Memory 730 includes instructions for occlusion-based height estimation 732. When processor 710 executes instructions 732, processor 710 performs the operations described above with reference to FIG. 6 to perform occlusion-based height estimation.

In some embodiments, system 700 includes graphics processor(s), field programmable gate array(s) (FPGA), and/or application specific integrated circuit(s) to perform some or all of the described functions. Similarly, memory structures may also be included in the hardware fabric.

Figure 8:
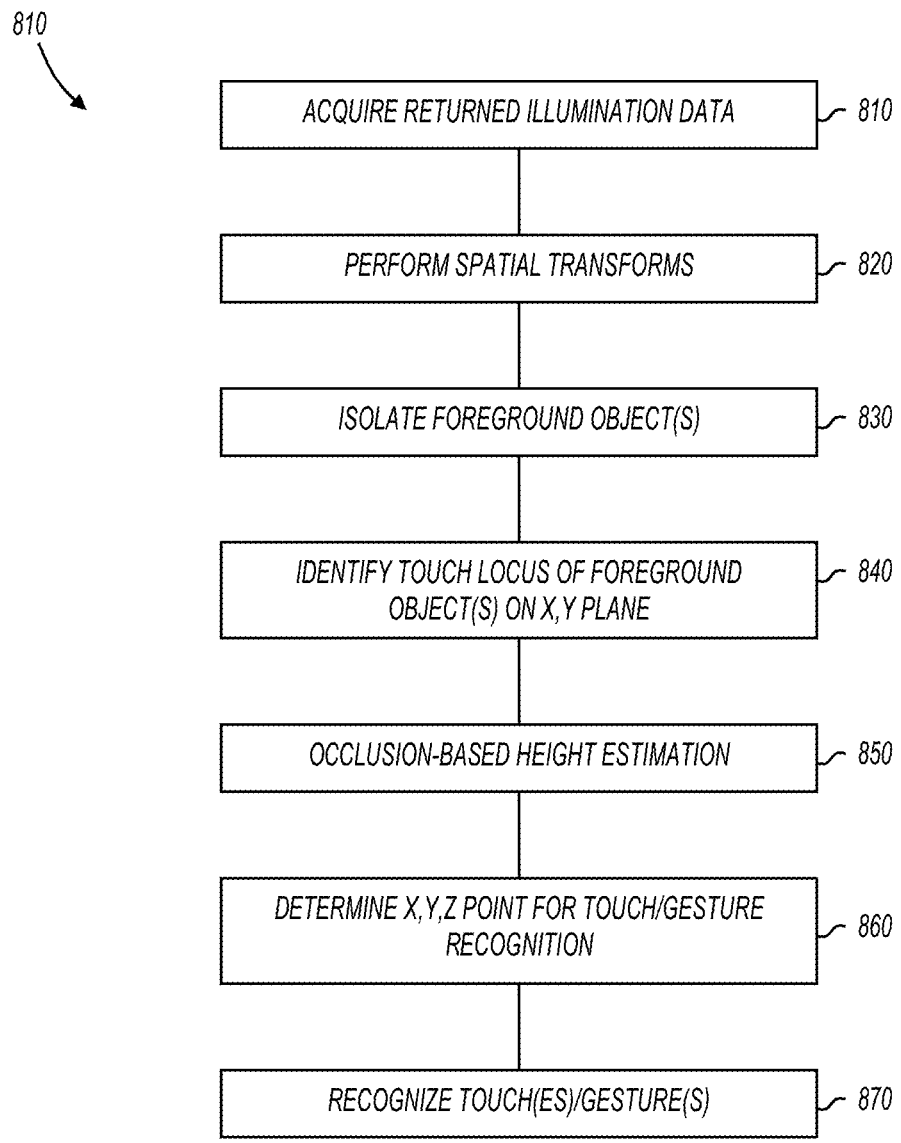
FIG. 8 shows a flowchart of methods in accordance with various embodiments of the present invention.

FIG. 8 shows a flowchart of methods in accordance with various embodiments of the present invention. Method 800 represents actions that may be performed by a system that includes occlusion-based height estimation. In some embodiments, some actions listed in method 800 are omitted. For example, some embodiments only include occlusion-based height estimation as described above. Other embodiments include one or more additional actions in combination with occlusion-based height estimation. Each of the actions shown in method 800 is described in further detail herein with reference to different figures.

Method 800 includes acquiring returned illumination data at 810. In some embodiments, returned illumination data is acquired by measuring a property of a scanned beam of light reflected off a foreground object and a background surface within a field of view. For example, in some embodiments, the returned illumination data may be a measured amplitude of returned signals, measured time-of-flight of returned signals, or some other measurement of returned signals.

Spatial transforms are performed at 820 to resolve a 2D image normal to the projection plane. Spatial transforms may include geometric transforms, positional conversions, coordinate transformations, and the like. Note that resolving to a 2D image normal to the projection plane is not necessary prior to performing occlusion-based height estimation.

Any foreground object(s) are isolated from the background at 830. Image processing techniques may be performed at 830 to extract/isolate foreground objects (fingers, gesturing implements) from the background (projection surface, non-interactive objects). Various embodiments make use of returned illumination data in the form of amplitude data, ToF data, and a combination of amplitude and TOF data to differentiate between the background surface, any foreground objects, and the occlusion area.

The touch locus of any foreground object(s) is identified at 840. For example, when the foreground object includes one or more fingers, the touch locus for each identified finger is determined as an (x,y) position on the image plane.

Occlusion-based height estimation is performed at 850. Occlusion-based height estimation calculates the distance above the background surface for each identified touch locus using the measured surface occlusion width and implied angular distance between the edge of the foreground object and the edge of the occlusion. Occlusion-based height estimation is described above with reference to FIG. 6. The results of occlusion-based height estimation may be averaged in space and/or time to increase resolution.

The true 3D (x,y,z) position of each foreground object's touch locus is identified at 860. 3D position is useful for touch determination as well as gesture recognition in 3D space away from the background surface. The 3D position may be passed to an application layer for touch/gesture recognition at 870.

Figure 9:
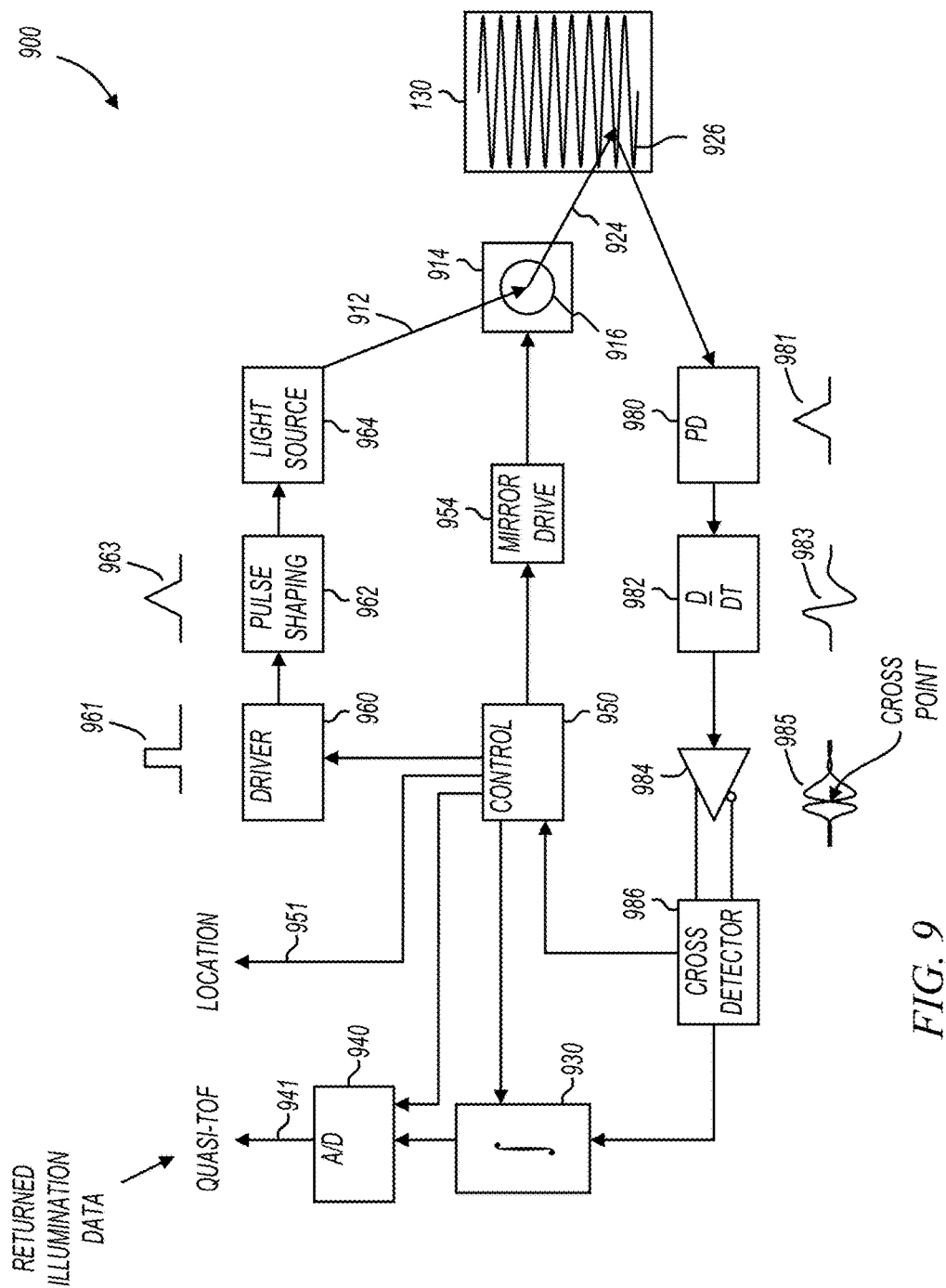
FIG. 9 shows a projector with quasi-ToF data as returned illumination data in accordance with various embodiments of the present invention.

FIG. 9 shows a projector with quasi-ToF data as returned illumination data in accordance with various embodiments of the present invention. As described further below, the returned illumination data is referred to as "quasi"-ToF because the methods described herein are robust even when a ToF system cannot determine a time of return accurately due to pulse shape and or amplitude corruption. This corruption can be due to qualities of the reflecting surface or due to the quality of the hardware. So although the projector measures a time value for each received reflected light pulse, the resulting returned illumination data may not represent actual time of flight of the reflected light. While accuracy of ToF data is compromised, the relative separation of foreground objects and background surface is still preserved in the illumination data.

Projector 900 may be included within any of the projection apparatus described herein. For example, projector 900 may be included within projection apparatus 100 with TX/RX disparity in two dimensions, or may be included within any of the projection apparatus with TX/RX disparity in one dimension. As shown in FIG. 9, projector 900 includes a light source 964, which may be a laser light source such as a laser diode or the like, capable of emitting a laser beam 912. The beam 912 impinges on a scanning platform 914 which is part of a microelectromechanical system (MEMS) based scanner or the like, and reflects off of scanning mirror 916 to generate a controlled output beam 924. A scanning mirror drive circuit 954 provides one or more drive signal(s) to control the angular motion of scanning mirror 916 to cause output beam 924 to generate a raster scan 926 on a projection surface 130. In operation, light source 964 produces light pulses and scanning mirror 916 reflects the light pulses as beam 924 traverses any suitable scanning pattern 926.

In some embodiments, raster scan 926 is formed by combining a sinusoidal component on the horizontal axis and a sawtooth component on the vertical axis. In these embodiments, controlled output beam 924 sweeps back and forth left-to-right in a sinusoidal pattern, and sweeps vertically (top-to-bottom) in a sawtooth pattern with the display blanked during flyback (bottom-to-top). FIG. 9 shows the sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting scanning pattern.

Projector 900 also includes integrator 930, control circuit 950, driver 960, and pulse shaping circuit 962. Control circuit 950 commands driver 960 to create a pulse, and also commands integrator 930 to start an integration period. In some embodiments, control circuit 950 delays the start of the integration period to compensate for time delays within the system.

Driver 960 creates a pulse with a desired amplitude and pulse width, and pulse shaping circuit 962 shapes the pulse into a pulse with an abruptly changing amplitude shown at 963. The abruptly changing amplitude is useful for timing measurement as is further explained below. In some embodiments, pulse 963 is a triangle shaped pulse, and pulse shaping circuit 962 may create the triangle shaped pulse in any manner without departing from the scope of the present invention. For example, a series of resistor/capacitor (RC) circuits may be used to charge and discharge, thereby forming the triangle shaped pulse.

The light pulse created by light source 964 is reflected off scanning mirror 916 and is then reflected off projection surface 130. The reflected pulse is sensed at photodetector (PD) 980, as shown at 981. In these embodiments, scanning mirror 916 corresponds to transmitter 110 and PD 980 corresponds to receiver 120 (FIG. 1). The reflected pulse may exhibit significant amplitude variations based on the distance to the projection surface 130, but the abrupt change in amplitude remains largely intact. Differentiator 982 then differentiates the reflected pulse and produces the differentiated pulse shown at 983. It is important to note that the point on pulse 981 corresponding to the abrupt change in amplitude (the peak of the triangle shaped pulse) now corresponds to the rapidly falling portion of the differentiated pulse 983.

Amplifier 984 receives the differentiated pulse 983 and produces a differential output shown at 985. The two differential output signals are shown superimposed on each other at 985, and the point at which they cross is referred to herein as the "cross point". Cross detector 986 receives the differential output signals shown at 985 and detects the timing of the cross point. In some embodiments, cross detector 986 includes a differential amplifier to perform the cross detection.

Cross detector 986 notifies control circuit 950 and integrator 930 when the cross point is detected. Control circuit 950 may reset and prepare to send another pulse, and integrator 930 may end the integration period based on the timing of the cross point. Analog-to-digital converter (A/D) 940 receives the output of integrator 930 and produces a digital signal on node 941 that corresponds to a measured time-of-flight (ToF) of the laser pulse, which in turn should correspond to the distance between projector 900 and projection surface 130. The method above refers to a Time to Amplitude Conversion approach, where the amplitude to which the capacitor is charged corresponds to ToF of the photon to the target and back. This is not a limitation of the system. An alternate method that can be employed is a Time to Digital Conversion, where a counter is started and stopped based on an outgoing ToF pulse and a corresponding returned signal. The measured delay (counter reading) corresponds to the actual Time of Flight of a photon to go to the target and back. In practice, for very short distances between mirror 916 and projection surface 130, the variance in measured ToF can be large based on the reflectance of projection surface 130. So, for short distances, the returned illumination data produced by ADC 940 is referred to herein as "quasi-ToF" data.

Although FIG. 9 shows an integrator and an analog to digital converter to measure time of flight, this is not a limitation of the present invention. For example, in some embodiments, ToF is measured more directly by running the phase crossing information through a time-to-digital converter (TDC) rather than the integration stage and ADC.

In some embodiments, control circuit 950 also has knowledge of the position of scanning mirror 916, and therefore also has knowledge of the location in raster pattern 926 for which the returned illumination data has been measured. Control circuit 950 may output the location information at 951. The combination of location information at 951 and quasi-ToF information at 941 provides a 3D image of projection surface 130 that, for short distances, has a large variance in the 3D information. Should a foreground object exist in front of projection surface 130, then the combination of location information at 951 and quasi-ToF information at 941 provides an image that may allow the foreground object to be distinguished from the projection surface even though the measured information does not accurately represent distance.

Control circuit 950 may influence the operation of scanning mirror control circuit 954 or may receive information regarding its operation. For example, in some embodiments, control circuit 950 may control the timing of light pulses produced by light source 964 as well as the timing of the scan pattern. In other embodiments, mirror drive circuit 954 controls the timing of the scan pattern, and control circuit 950 is provided this timing information.

Control circuit 950 may be implemented in hardware, software, or in any combination. For example, in some embodiments, control circuit 950 is implemented in an application specific integrated circuit (ASIC). Further, in some embodiments, some of the faster data path control is performed in an ASIC and overall control is software programmable.

In some embodiments, light source 964 sources nonvisible light such as infrared light. In these embodiments, PD 980 is able to detect the same wavelength of nonvisible light. For example, in some embodiments, light source 964 may be an infrared laser diode that produces light with a wavelength of substantially 808 nanometers (nm). In other embodiments, light source 964 sources visible light such as blue light. In these embodiments, PD 980 is able to detect the same visible light. For example, in some embodiments, light source 964 may be a blue laser diode that produces light with a wavelength of substantially 405 nanometers (nm). The wavelength of light is not a limitation of the present invention. Any wavelength, visible or nonvisible, may be used without departing from the scope of the present invention.

In some embodiments light source 964 includes at least one visible light source and at least one nonvisible light source. For example, light source 964 may include red, green, and blue laser light sources that are modulated on a pixel by pixel basis to create an image as mirror 916 reflects the laser light beam in raster pattern 926. Further, light source 964 may also include an IR laser light source that gets modulated according to the mechanism shown in FIG. 9. In these embodiments, a user can interact with displayed imagery as occlusion-based height estimation is performed while the imagery is displayed.

In some embodiments, mirror 916 is replaced by two mirrors, one scanning in one dimension, and a second scanning in a second dimension.

In embodiments represented by FIG. 9, returned illumination values that are very large (or non-existent) represent occlusion codes. A histogram of example quasi-ToF returned illumination data is described further below with reference to FIG. 20.

Figure 10:
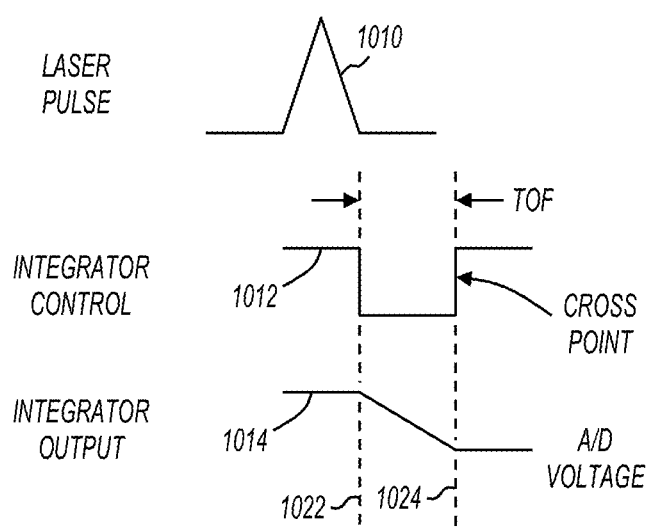
FIG. 10 shows a laser pulse and integrator operation in accordance with various embodiments of the present invention.

FIG. 10 shows a laser pulse and integrator operation in accordance with various embodiments of the present invention. Laser pulse 1010 is an example of a laser pulse with an abrupt change in amplitude. Laser pulse 1010 represents a pulse of light generated by light source 964 and reflected by scanning mirror 916. When laser pulse 1010 is created, control circuit 950 modifies the integrator control signal 1012 at time 1022. In response to this control signal, integrator 930 begins an integration time.

In some embodiments, integrator 930 is an analog integrator that linearly modifies an output voltage during an integration time. One example integrator output voltage is shown at 1014. After the falling edge of the integrator control signal at 1022, the integrator output voltage begins to change. When cross detector 986 detects the cross point, control circuit 950 again modifies the integrator control signal as shown at time 1024. In response, integrator 930 stops the integration and the integration time comes to an end. The voltage of integrator output 1014 represents the laser pulse TOF. The A/D 940 digitizes this voltage, and the process can start over.

As shown in FIG. 10, control circuit 950 may start the integration sometime after laser pulse 1010 is created. This compensates for time delay in the various circuits shown in FIG. 9. For example, differentiator 982 and amplifier 984 may exhibit a finite delay that can be compensated.

The method above refers to a Time to Amplitude Conversion approach, where the amplitude to which the capacitor is charged corresponds to ToF of the photon to the target and back. This is not a limitation of the system. An alternate method that can be employed is a Time to Digital Conversion, where a counter is started and stopped based on an outgoing ToF pulse and a corresponding returned signal. The measured delay (counter reading) corresponds to the actual Time of Flight of a photon to go to the target and back.

The rate at which pulses are created, reflected, and processed in the receive signal path may determine the horizontal spatial measurement resolution on raster pattern 926. For example, if pulses are created far apart in time, then measured points on raster pattern 926 may be further apart, and the horizontal spatial resolution will decrease. Also for example, if pulses are created closer in time, then the horizontal spatial resolution can increase.

Figure 11:
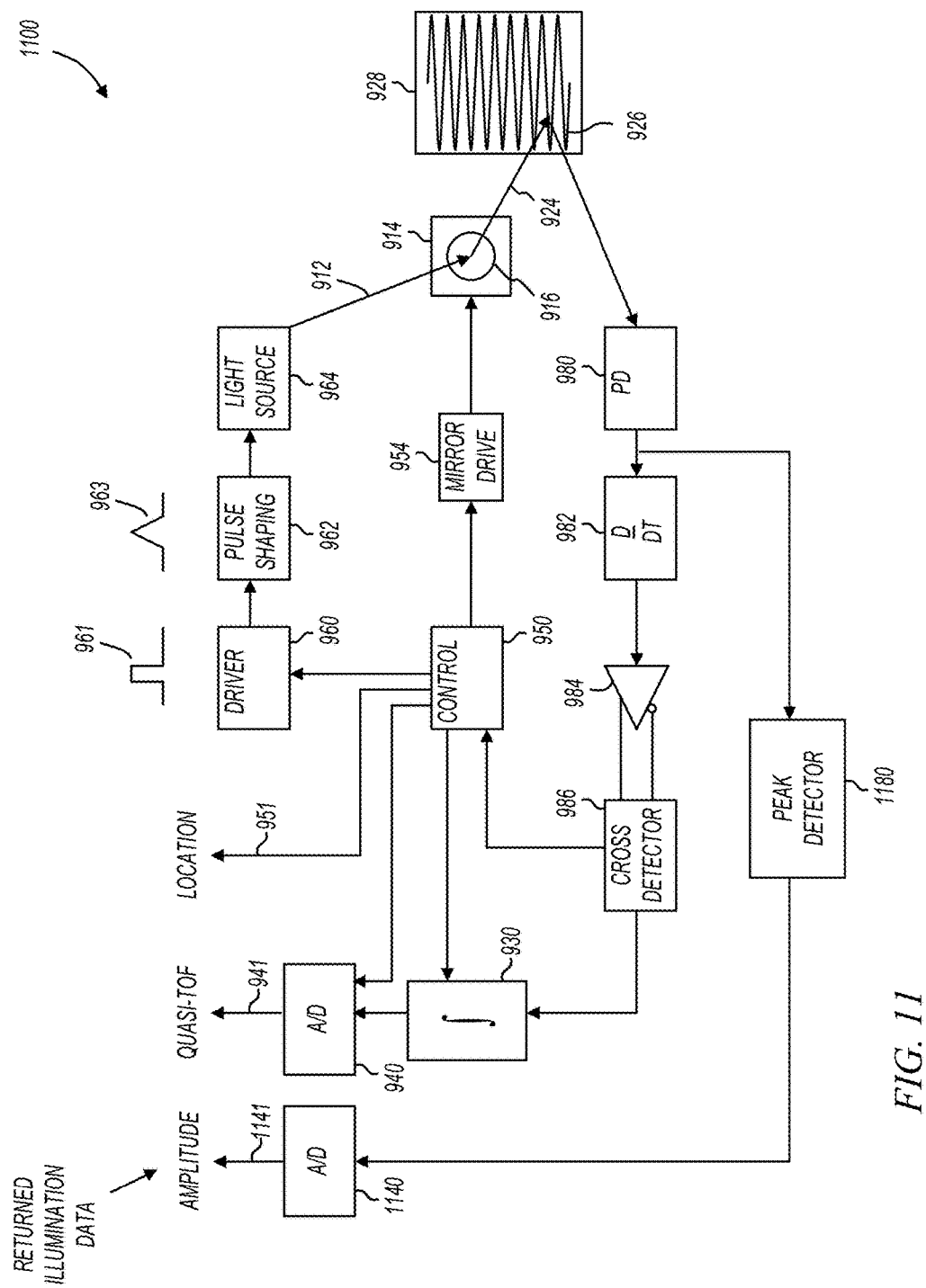
FIG. 11 shows a projector with amplitude data as returned illumination data in accordance with various embodiments of the present invention.

FIG. 11 shows a projector with amplitude data as returned illumination data in accordance with various embodiments of the present invention. Projector 1100 may be included within any of the projection apparatus described herein. For example, projector 1100 may be included within projection apparatus 100 with TX/RX disparity in two dimensions, or may be included within any of the projection apparatus with TX/RX disparity in one dimension. All of the items shown in FIG. 11 have previously been described with reference to FIG. 9 except for peak detector 1180 and A/D 1140.

Peak detector 1180 detects the amplitude of the reflected light pulses as received by PD 980. A/D 1140 digitizes this information for each received pulse and produces digital amplitude values at 1140. In these embodiments, the digital amplitude values represent the returned illumination data.

In embodiments represented by FIG. 11, returned illumination values that are very small (or non-existent) represent occlusion codes. A histogram of example amplitude returned illumination data is described further below with reference to FIG. 21.

Figure 12:
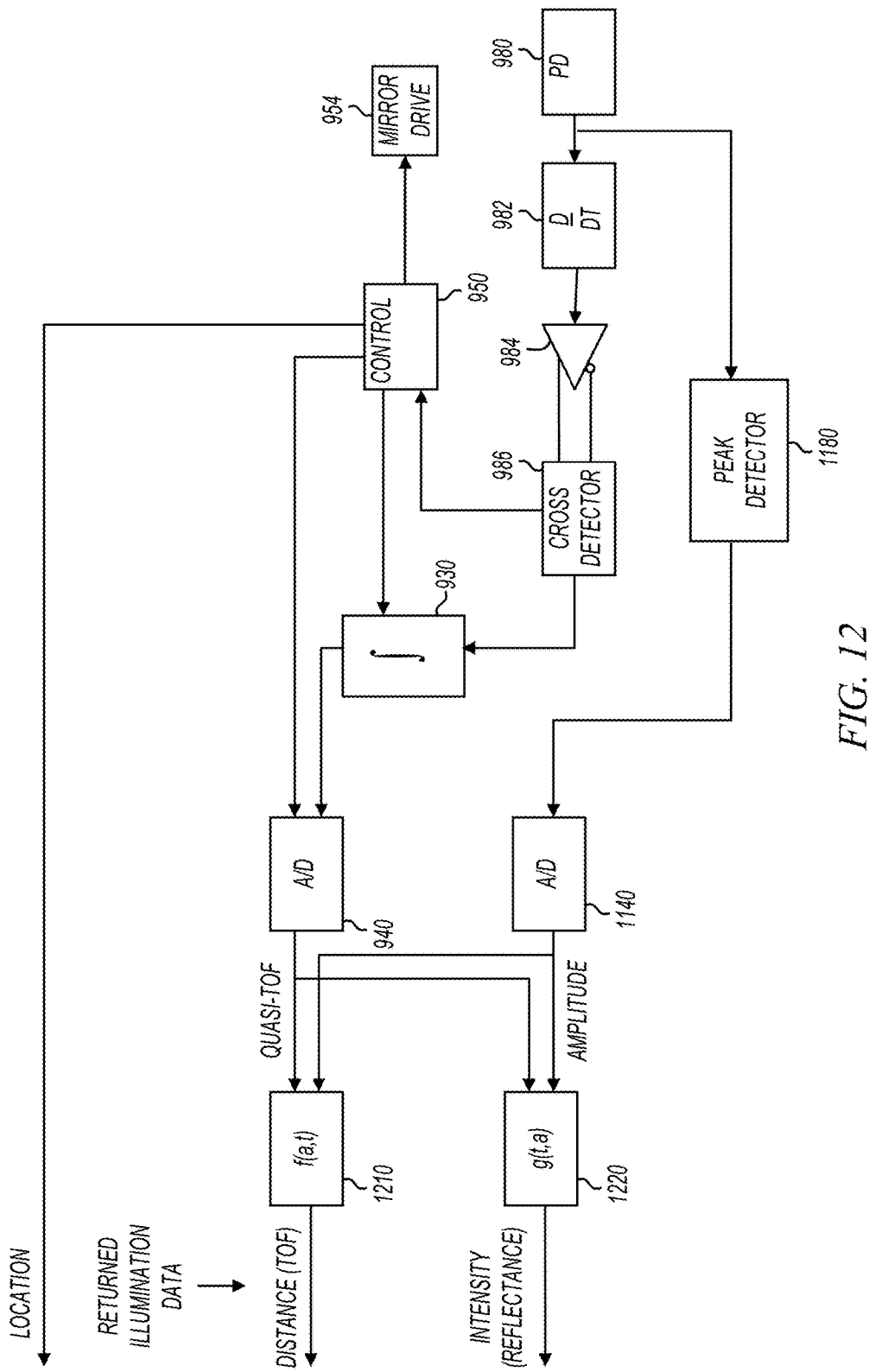
FIG. 12 shows projector components with ToF and reflectance data as returned illumination data in accordance with various embodiments of the present invention.

FIG. 12 shows projector components with TOF and reflectance data as returned illumination data in accordance with various embodiments of the present invention. Projector components 1200 may be included within any of the projection apparatus described herein. For example, projector components 1200 may be included within projection apparatus 100 with TX/RX disparity in two dimensions, or may be included within any of the projection apparatus with TX/RX disparity in one dimension. All of the items shown in FIG. 12 have previously been described with reference to FIGS. 9 and 11 except for functional blocks 1210 and 1220.

Functional block 1210 receives quasi-ToF data t from A/D 940 and amplitude data a from A/D 1140, and performs function $f(a,t)$. $f(a,t)$ removes the amplitude dependence from the ToF data and outputs a corrected ToF that represents the actual distance to the target.

Functional block 1220 receives quasi-ToF data t from A/D 940 and amplitude data a from A/D 1140, and performs function $g(a,t)$. $g(a,t)$ removes the ToF dependence from the amplitude data and outputs a reflectance that represents the actual light intensity reflected off the target.

Functional blocks 1210 and 1220 may be implemented in any fashion. For example, in some embodiments, functional blocks 1210 and 1220 may be implemented as look-up tables in memory devices. For example, output values $f$ for all possible input values a and t may be experimentally determined, and a memory device may be loaded with the $f$ values. When the memory device is addressed using a and t, the resulting output implements $f(a,t)$. The function $g(a,t)$ may be similarly implemented.

In embodiments, represented by FIG. 12, the ToF data that represents actual distance may be used as the returned illumination data. In these embodiments, returned illumination values that are very large (or non-existent) represent occlusion codes. A histogram of example ToF returned illumination data is described further below with reference to FIG. 22.

Figure 13:
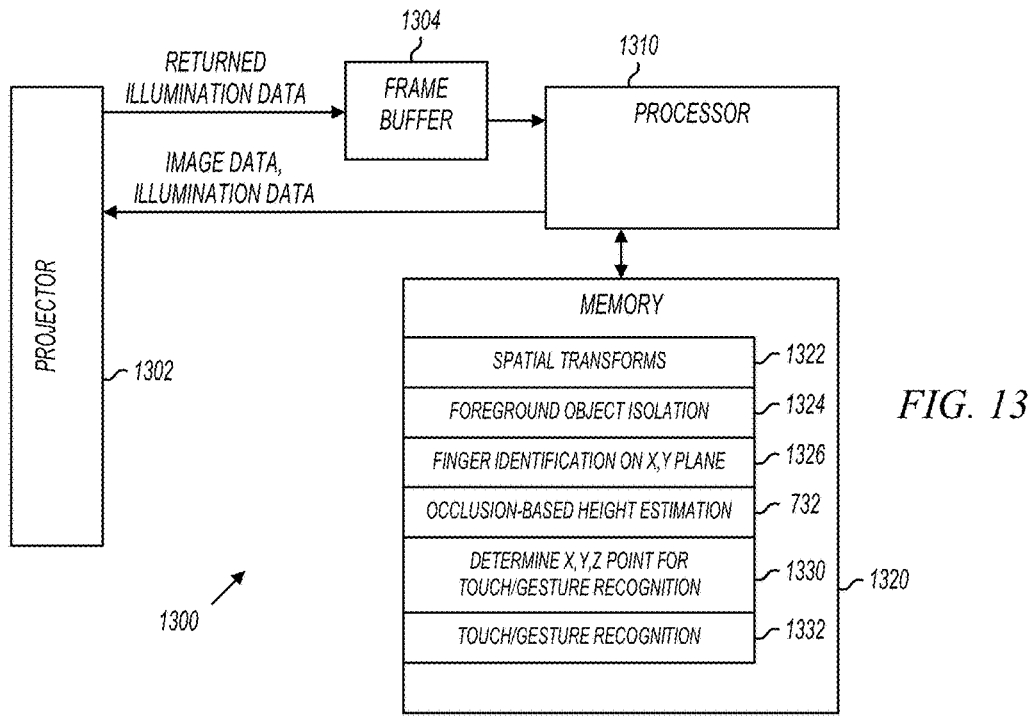
FIGS. 13 and 14 show processing systems in accordance with various embodiments of the present invention.
Figure 14:
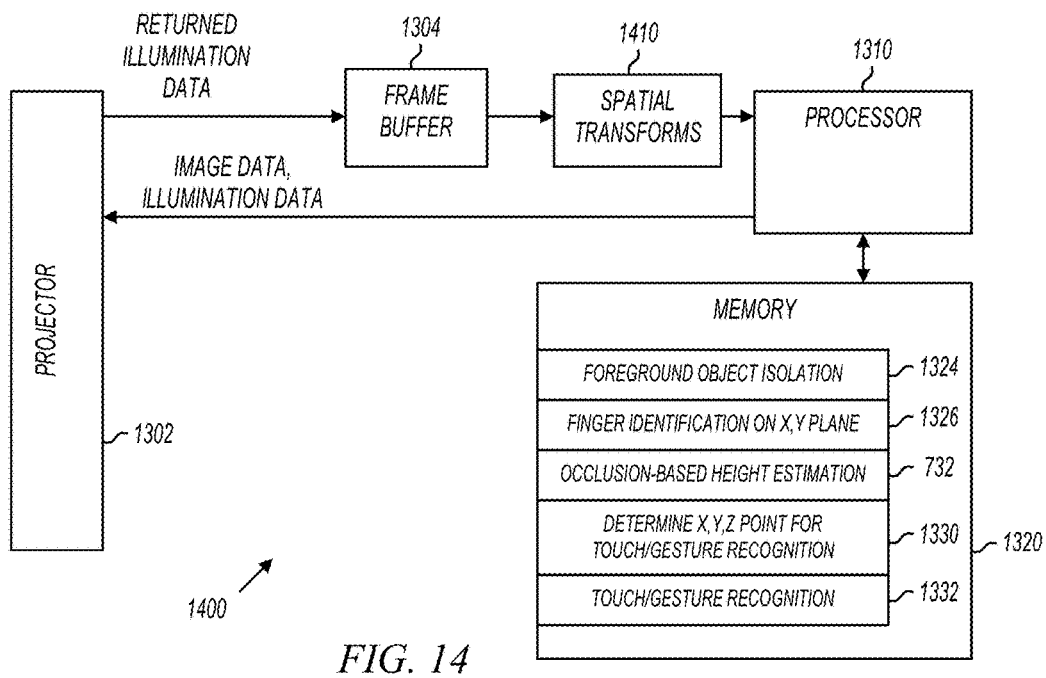

FIGS. 13 and 14 show processing systems in accordance with various embodiments of the present invention. FIG. 13 shows system 1300 including projector 1302, frame buffer 1304, processor 1310, and memory 1320. In operation, system 1300 performs some or all of the actions of method 800 (FIG. 8). System 1300 may be included in any projection apparatus described herein. For example, System 1300 may be included in projection apparatus 100 (FIGS. 1, 2) to allow a user to interact with projected content.

In some embodiments, processor 1310 provides image data to projector 1302. This image data represents the images and/or video to be projected into the field of view by projector 1302. Processor 1310 also provides illumination data to projector 1302. The illumination data represents the IR illumination data to be projected into the field of view for the purposes of collecting returned illumination data. In some embodiments, the illumination data represents only pixel coordinates within an image or scanning mirror angles to specify where in the field of view IR light pulses are transmitted.

Processor 1310 performs some or all of the actions listed, including occlusion-based height estimation and gesture recognition. In response to user interaction in the form of touch events and/or gestures, processor 1310 may change the image data and/or illumination data to further interact with the user.

Projector 1302 may be any projector described herein. For example, projector 1302 may be a projector with TX/RX disparity in any number of dimensions, and may measure any type of signal to generate returned illumination data. In operation, projector 1302 performs the data acquisition actions of 810 (FIG. 8) as described with reference to FIGS. 9-12.

Frame buffer 1304 receives and stores one or more image frames of returned illumination data as generated by projector 1302. For example, in laser scanning mirror projector embodiments, laser light pulses may be emitted in a raster pattern and returned illumination data may be measured for the same raster pattern, resulting in a 2D array of data for each frame. The frame buffer may also store the mirror angle information corresponding to the location within the image of each datum within the returned illumination data, or the location may be implicit based on the storage location within frame buffer 1304.

Processor 1301 may be any type of processor capable of executing instructions and performing mathematical calculations. For example, processor 1310 may be a microprocessor, a digital signal processor, or the like. Memory 1320 may be any type of memory capable of non-transitory storage of processor instructions. For example, memory 1320 may a volatile or nonvolatile semiconductor storage device such as static random access memory or FLASH memory. Memory 1320 may also include magnetic or optical storage.

Memory 1320 includes instructions for spatial transforms 1322, foreground object isolation 1324, finger identification on the x,y plane 1326, occlusion-based height estimation 732, determining the x,y,z point for touch/gesture recognition 1330, and touch/gesture recognition 1332. When processor 1310 executes instructions 1322, processor 1310 performs the actions of 820 (FIG. 8) as further described below. When processor 1310 executes instructions 1324, processor 1310 performs the actions of 830 (FIG. 8) as further described below. When processor 1310 executes instructions 1326, processor 1310 performs the actions of 840 (FIG. 8) as further described below. When processor 1310 executes instructions 732, processor 1310 performs the operations described above with reference to FIG. 6 to perform occlusion-based height estimation. When processor 1310 executes instructions 1330, processor 1310 performs the actions of 860 (FIG. 8) as further described below. When processor 1310 executes instructions 1332, processor 1310 performs the actions of 8370 (FIG. 8) as further described below.

FIG. 14 shows system 1400 including projector 1302, frame buffer 1304, spatial transforms 1410, processor 1310, and memory 1320. In operation, system 1400 performs some or all of the actions of method 800 (FIG. 8). System 1400 may be included in any projection apparatus described herein. For example, System 1400 may be included in projection apparatus 100 (FIGS. 1, 2) to allow a user to interact with projected content.

System 1400 differs from system 1300 only in that spatial transforms 1410 are performed before the returned illumination data reaches processor 1310. In some embodiments, spatial transforms 1410 are performed in hardware or by a specialized processor. For example, in some embodiments, spatial transforms 1410 are performed by digital multiplier and accumulator circuits to apply rotation matrices and coordinate conversions to the returned illumination data.

Also for example, in some embodiments, spatial transforms 1410 are performed by a dedicated graphics processor designed to accelerate graphics rendering.

Although system 1400 shows spatial transforms in hardware and the remaining image processing performed in software by processor 1310, this is not a limitation of the present invention. For example, any number of the actions of method 800 may be performed in hardware and in some embodiments, processor 1310 and memory 1320 are omitted.

Figure 15:
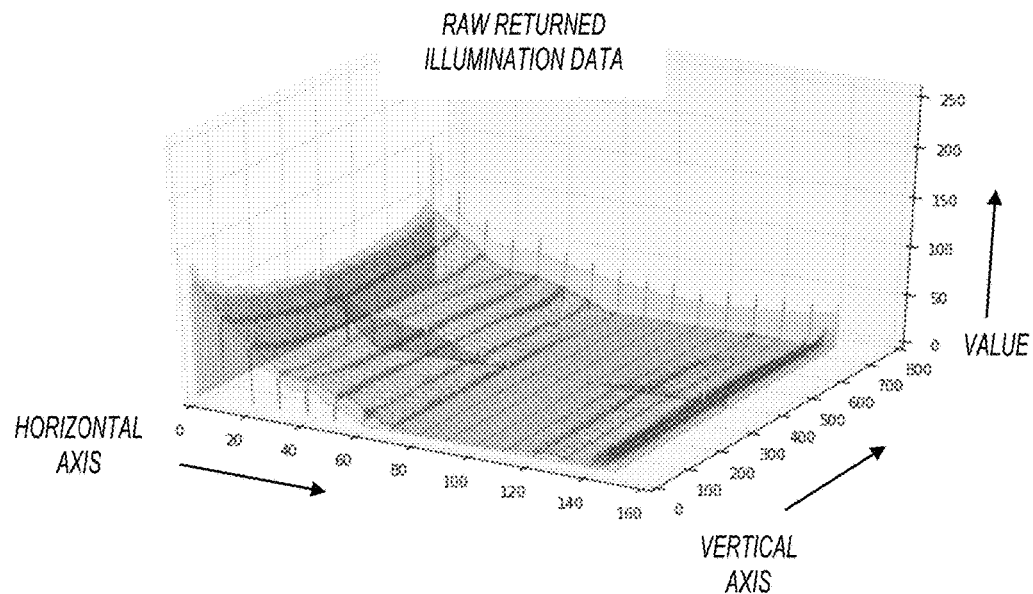
FIG. 15 shows a 3D plot of raw returned illumination data of a projection surface in accordance with various embodiments of the present invention.

FIG. 15 shows a 3D plot of raw returned illumination data of a projection surface in accordance with various embodiments of the present invention. The raw returned illumination data shown in FIG. 15 represents the contents of frame buffer 1301 (FIG. 13) for one frame. The displayed raw returned illuminated data represents quasi-ToF data, but the actions described herein apply to any type of returned illumination data. The values of the raw returned illumination data array represent the quasi-ToF from the transmitter to the first object encountered in the field-of-view (FOV) at the scan angle corresponding to each value. Visualizing this raw data directly in a 2D array on a fixed grid gives a rough idea of the scene the ToF sensor has measured.

In some embodiments, the horizontal axis corresponds to a scanning mirror axis in which the scanning mirror moves sinusoidally, and the vertical axis corresponds to a scanning mirror axis in which the scanning mirror moves linearly. For example, in embodiments represented by FIG. 15, a scanning laser projector may scan 760 lines in the vertical axis and may emit 150 IR light pulses per line.

Spatial Transforms

In some embodiments, returned illumination data undergoes one or more spatial transformation(s) prior to undergoing 2D image processing algorithms. In some embodiments, the spatial transformation(s) take the raw returned illumination data and convert them to a 2D rectangular grid suitable for image processing kernels. For example, if imaging a flat background plane with no foreground information, the 'z' values associated with the 2D grid should become relatively constant as a result of this transformation.

In some embodiments, spatial transformations include interpolation to account for angular fixed interval pulsing and coordinate transforms from the view of the receiver to planar-normal space.

Figure 16:
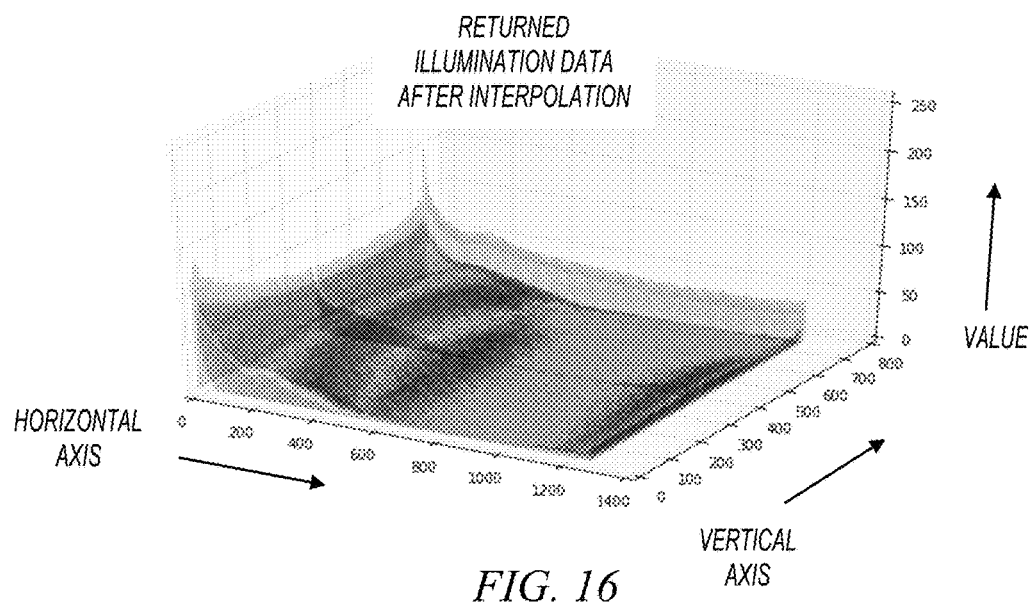
FIG. 16 shows a 3D plot of returned illumination data of a projection surface after interpolation in accordance with various embodiments of the present invention.

FIG. 16 shows a 3D plot of returned illumination data of a projection surface after interpolation in accordance with various embodiments of the present invention. In some embodiments, interpolation techniques are used to convert from the angular scan domain to a fixed rectangular space. During this step, oversampling near the edges due to the sinusoidal velocity of the scanning measurement system is addressed. Note that in FIG. 16, the number of returned illumination data points has increased on the horizontal axis due to the interpolation.

Following interpolation, the returned illumination data values are associated with a rectangular grid, but still represent quasi-ToF rays in polar coordinate space. An additional coordinate transform may be used to map the returned illumination data values into a planar-normal image. In this step, the receiver perspective is projected onto the projection surface plane in the linear algebra sense.

Figure 17:
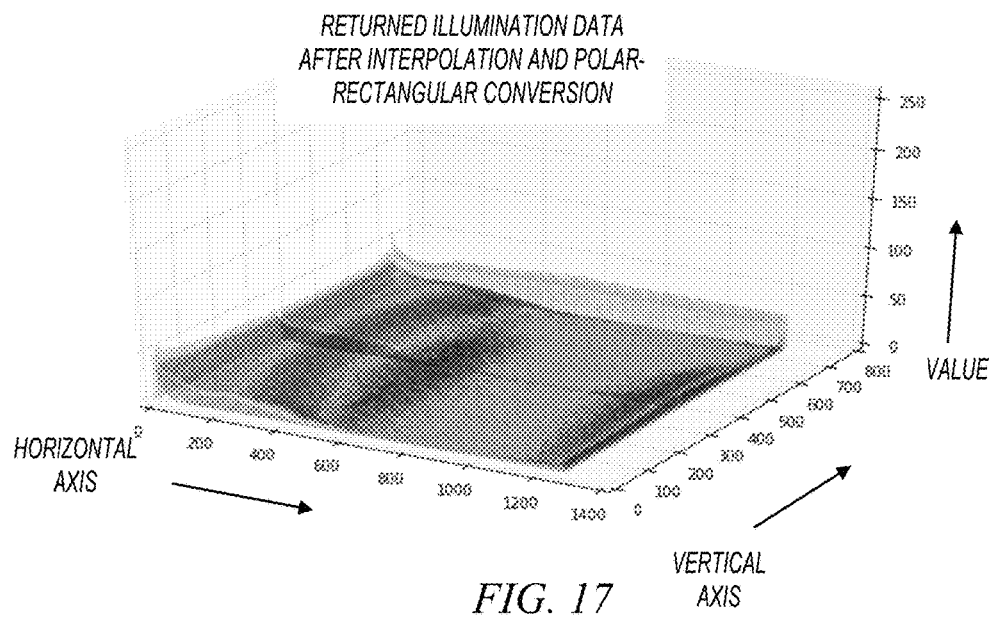
FIG. 17 shows a 3D plot of returned illumination data of a projection surface after interpolation and polar-to-rectangular coordinate conversion in accordance with various embodiments of the present invention.

If the TX/RX disparity is normal to the projection surface, this transformation may be performed by a simple polar to rectangular conversion. If the TX/RX disparity is at an oblique angle, a cascaded set of scalar rotation matrices can be used for the transform. An example is shown in FIG. 17 after polar to rectangular conversion.

For many of these calculations, a scalar transformation matrix can be precomputed based on a given application configuration and then applied to each measurement frame during run-time. Further, in some embodiments, the system self-detects the projection surface plane and calibrates to it on the fly.

After the aforementioned spatial transforms, the image field should be relatively flat, though there may still be some non-uniform deviations from an ideal plane that arise from non-linear sensor gain in the collection components or receiver electronics. The remaining positional variance may be further nullified via calibration methods or the data may be presented to the rest of the image processing chain as-is.

Figure 18:
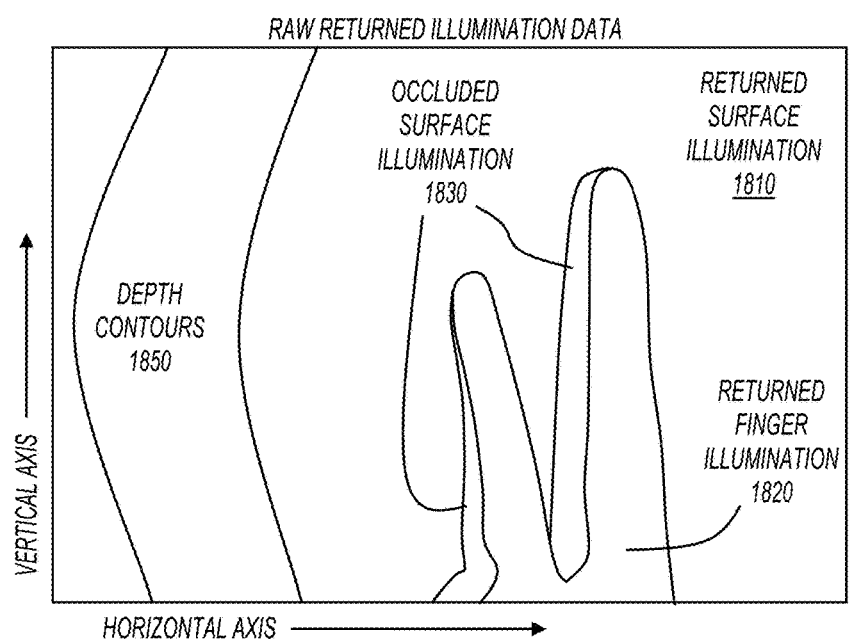
FIG. 18 shows a 2D representation of raw returned illumination data of a projection surface and a foreground object in accordance with various embodiments of the present invention.

FIG. 18 shows a 2D representation of raw returned illumination data of a projection surface and a foreground object in accordance with various embodiments of the present invention. FIG. 18 features two fingers present in the image plane, with one touching the surface and the other hovering above. This frame of ToF data will be repeatedly presented in future sections to illustrate progression through the image processing chain. FIG. 18 includes three main regions: returned surface illumination 1810, returned finger illumination 1820, and occluded surface illumination 1830. FIG. 18 also shows depth contours 1850. For flat projection surfaces, depth contours 1850 are removed by the spatial transformations.

The 2D representation of FIG. 18 represents a frame of raw returned illumination data. The returned illumination data may be quasi-ToF data, amplitude data, ToF data, or any other measured data that allows the different regions to be distinguished.

Figure 19:
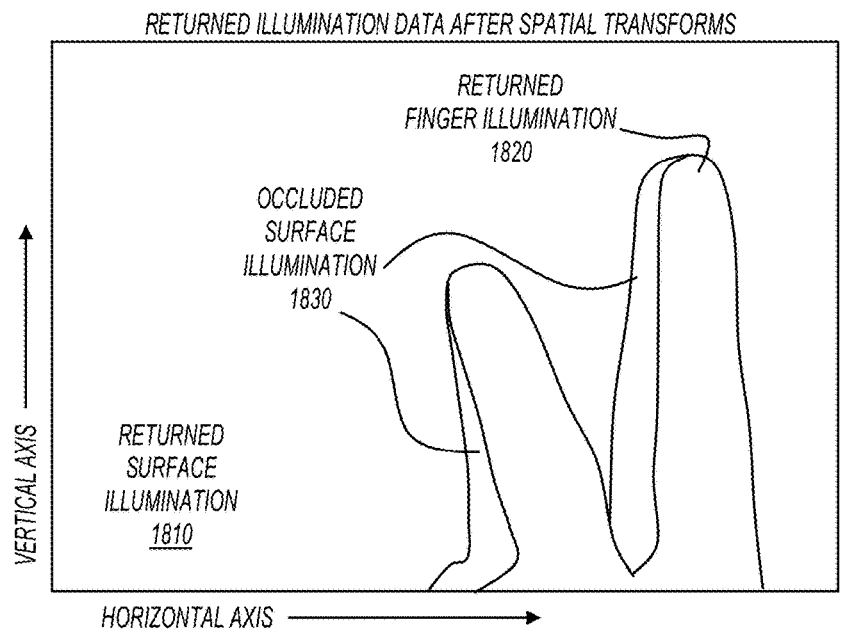
FIG. 19 shows a 2D representation of returned illumination data of a projection surface and a foreground object after spatial transforms in accordance with various embodiments of the present invention.

FIG. 19 shows a 2D representation of returned illumination data of a projection surface and a foreground object after spatial transforms in accordance with various embodiments of the present invention. The 2D representation of FIG. 19 represents the illumination data of FIG. 18 after undergoing the spatial transforms described above.

Foreground Object Isolation

In some embodiments, the first step to object identification and isolation is to utilize contrast in the grayscale image separating the foreground from the background. In some embodiments, the distribution of returned illumination data values tend to be roughly tri-modal, with values representing background (surface plane), foreground (hand/finger), and surface occlusion. Example histograms for various types of returned illumination data are shown in, and described with reference to, FIGS. 20-22.

Figure 20:
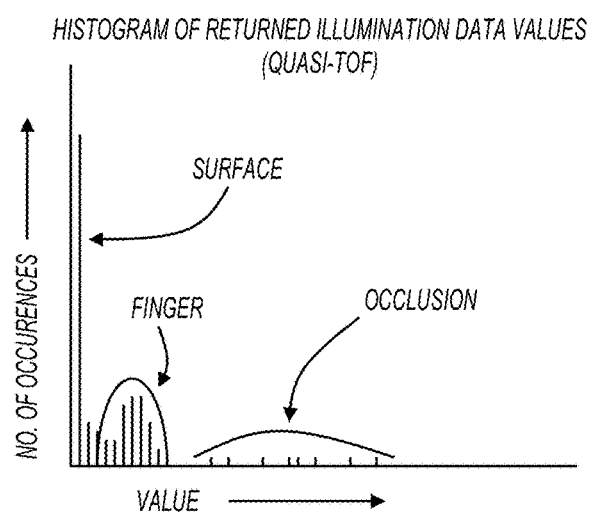
FIG. 20 shows a histogram of quasi-TOF data as returned illumination data in accordance with various embodiments of the present invention.

FIG. 20 shows a histogram of quasi-TOF data as returned illumination data in accordance with various embodiments of the present invention. The tri-modal distribution shown in FIG. 20 allows the foreground object (finger), the background surface, and the occlusion to be distinguished. Note that even though a time is measured for quasi-ToF, the amplitude dependence of the measurement yields somewhat unexpected results. The higher reflectivity of the background surface results in a higher return amplitude, which causes the time measurement to be short. Similarly, the somewhat lower reflectivity of the finger results in a lower return amplitude, which causes the time measurement to be longer. So even though the finger is closer than the surface, the quasi-ToF values for the finger are higher because of the amplitude dependence on reflectivity. The quasi-ToF measurements in the occlusion tend to be much larger or nonexistent. For example, some light pulses at the very edge of the occlusion are partially blocked and result in a very low amplitude return, and some light pulses are completed occluded and never return. In a time to amplitude approach, this may result in no measured quasi-ToF or a maximum value as the integrator times out.

Even though the quasi-ToF returned illumination data is really depth data convolved with amplitude of reflection (reflectance dependence) and is highly amplitude dependent, the data is still useful in part because of the tri-modal distribution that allows the surface, finger, and occlusion to be distinguished from one another.

Figure 21:
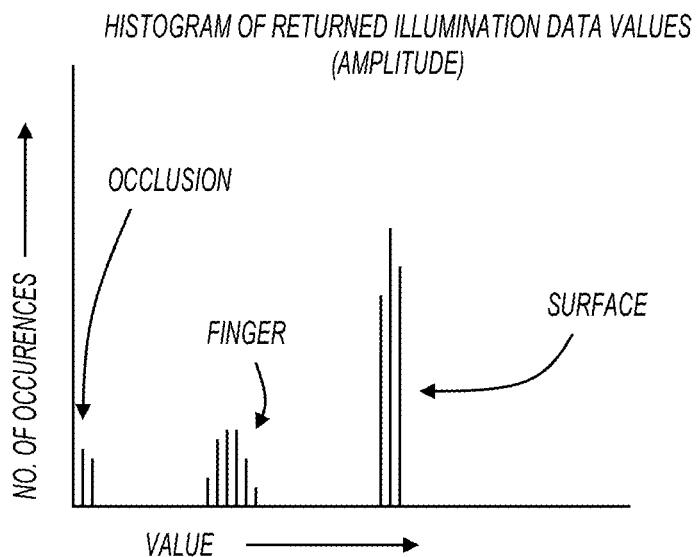
FIG. 21 shows a histogram of amplitude data as returned illumination data in accordance with various embodiments of the present invention.

FIG. 21 shows a histogram of amplitude data as returned illumination data in accordance with various embodiments of the present invention. The tri-modal distribution shown in FIG. 21 allows the foreground object (finger), the background surface, and the occlusion to be distinguished. The measured amplitude of the reflected light pulses tends to be highly dependent on the reflectivity of the target. Assuming the background surface is more reflective than the finger, the distribution in FIG. 21 results. In these embodiments, the tri-modal distribution is arranged differently than that shown for quasi-ToF data in FIG. 21, but the nature of the tri-modal distribution still makes it possible to distinguish between the background surface, the finger, and the occlusion.

Figure 22:
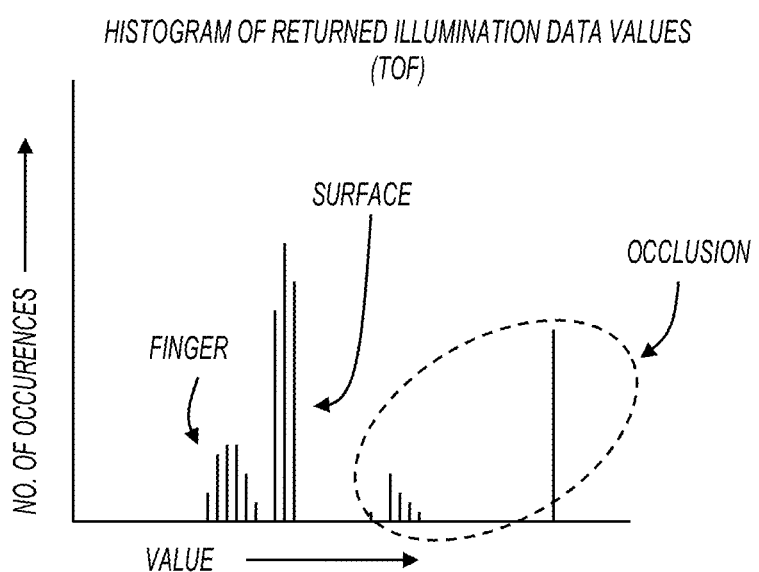
FIG. 22 shows a histogram of TOF data as returned illumination data in accordance with various embodiments of the present invention.

FIG. 22 shows a histogram of TOF data as returned illumination data in accordance with various embodiments of the present invention. The tri-modal distribution shown in FIG. 22 allows the foreground object (finger), the background surface, and the occlusion to be distinguished. The measured (and corrected ToF) provide data values that represent the actual distance to the target. This is shown in the tri-modal distribution of FIG. 22 where the finger has the lowest values, the surface has the next lowest values, and the occlusion has the largest (or nonexistent) values.

Figure 23:
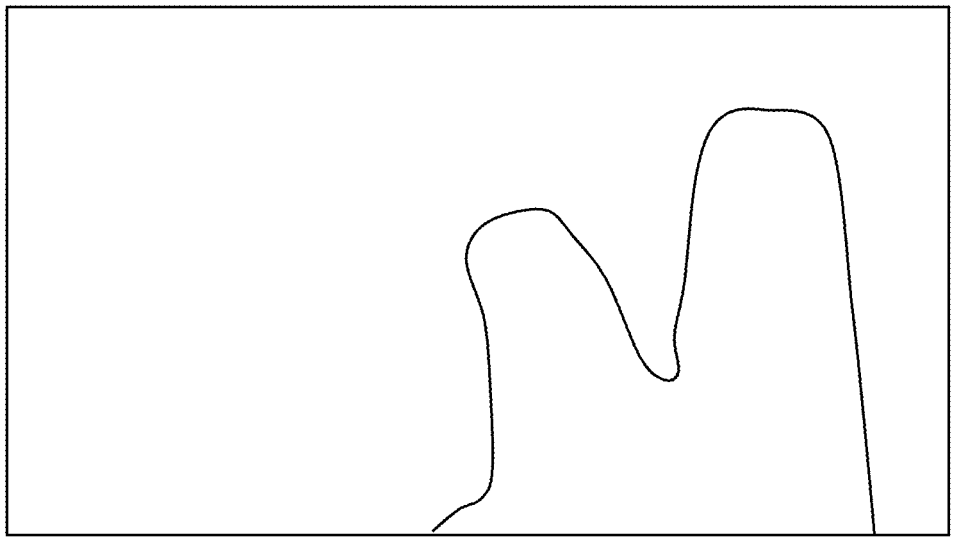
FIG. 23 shows foreground object isolation in accordance with various embodiments of the present invention.

FIG. 23 shows foreground object isolation in accordance with various embodiments of the present invention. Various methods may be used to isolate foreground objects. One method is to use edge detection, contour detection, and contour closure. Once foreground object isolation is complete, the binary distribution shown in FIG. 23 results. The two values represent the area inside the foreground object and the area outside the foreground object.

In embodiments where there is very little contrast between the foreground and the background, it is useful to extract both the foreground and surface occlusion codes as a single object. Many edge detection schemes are suitable, but the Canny algorithm is particularly effective as it can consider localized contrast to identify edges which is important when the properties of the tri-modal distribution change as a function of x,y grid position (due to imperfections in the receiver hardware and spatial transformation steps).

In some embodiments, the resulting edges form a boundary sufficient to create a contiguous object such that the shape and positioning of the foreground object (finger, hand, etc) may be properly identified. Some embodiments include additional action to increase the likelihood of continuity in the edge points. For example, during spatial transformation, 'nearest' interpolation may be utilized to reinforce surface occlusion values near edges and preserve contrast that would otherwise be degraded by a higher order interpolation method. Further, following spatial transformation, the resolution may be down-sampled such that edge information is compressed and forced toward overlapping/adjacent pixels. Also for example, after the initial edge points are produced from the edge detection algorithm, a dilation kernel can be run through the image to spread edge energy to adjacent pixels.

Once the edge information has been produced, enveloping contours can be drawn about the edge points. In some embodiments, the interiors of the fingers may not have sufficient contrast relative to the background to be differentiated, but the detected edges of the finger define an encapsulating boundary that isolates the intended foreground object.

When contours exist within the fingers, a binary image where all background content has been masked out may be achieved by:

1. Calculating the center of mass of all contours;
2. Calculating a point farthest away from that center of mass that is guaranteed to be exterior to any bounding contours;
3. Performing a flood-fill operation to highlight the background; and
4. Inverting the flood-filled image to turn all background content to zero and remaining pixels to one.

An example result of these processing stages when performed on the returned illumination data in FIG. 19 is shown in FIG. 23.

Touch Locus Identification

Once a binary image has been acquired, the task of identifying a touch locus from which to measure height about the background surface can begin. In some embodiments, this is an iterative operation where a coarse 2D finger detect is followed by the identification of finger tip(s), and a touch locus.

The method of performing the coarse 2D finger detection is enumerated and illustrated below. Additional details are provided below.

1. New contours are extracted from the binary image formed by closure of the original contours;
2. For each contour, a convex hull is generated and convexity defects are computed;
3. For each contour, its set of convexity defects is filtered to remove those that do not pass a minimum distance criterion;
4. For each contour that has one or more valid convexity defects, append to the finger list the contour points of the corresponding hull intersection;
5. For each remaining contour (those that have no valid convexity defects), identify the contour points that fall on the boundary edge of the image grid. Assign the middle index of the ordered edge points as the boundary reference point; and
6. For each contour with a boundary reference point, append to the finger list the contour point that is at the maximum distance from the reference point.

Figure 24:
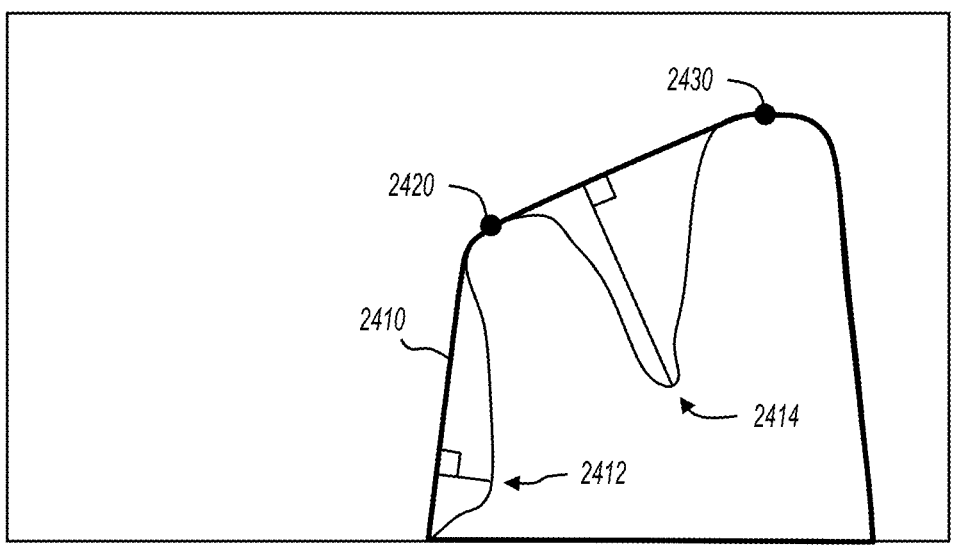
FIGS. 24 and 25 show the result of finger identification in accordance with various embodiments of the present invention.

FIG. 24 shows the result of finger identification for the multifinger returned illumination data in accordance with various embodiments of the present invention. In some embodiments, convex hull analysis is used to identify multiple fingers defined by a single bounding contour. FIG. 24 shows a convex hull at 2410.

One may think of the convex hull as the set of encapsulating points that would be formed by a rubber band stretched around the set of rigid contour points. For each concavity created by the line segment connecting adjacent intersections of the contour and convex hull, there exists one and only one convexity defect that is defined as the point on the contour whose ray to the point normal to the line segment is maximum in distance. Two convexity defects are shown at 2412 and 2414.

The largest intersection points are then used for coarse approximations of fingertip locations 2420 and 2430.

Figure 25:
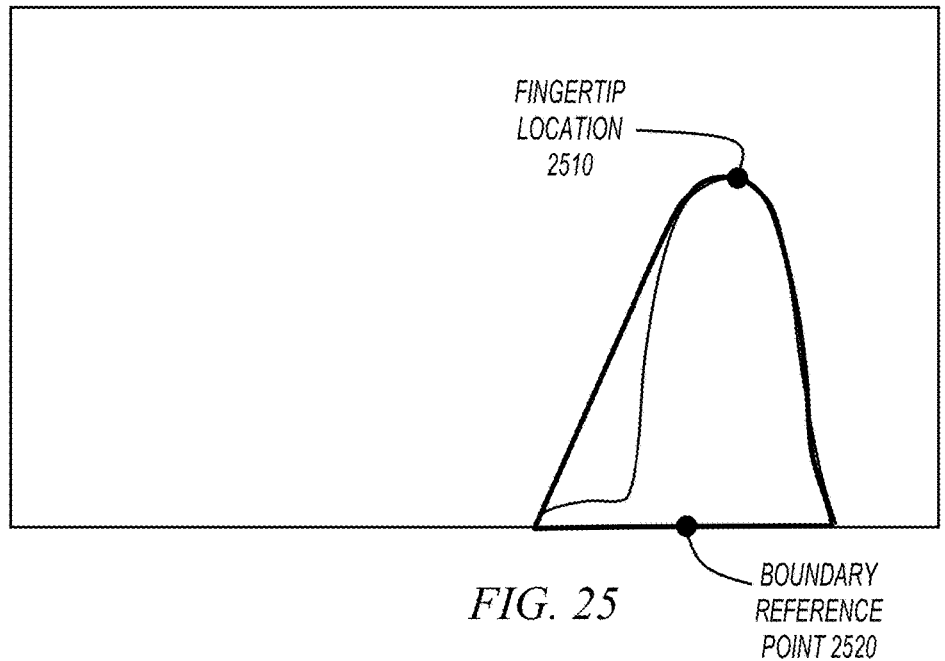

FIG. 25 shows the result of finger identification of a single finger in accordance with various embodiments of the present invention. If the convex hull analysis yields a contour with no valid convexity defects (e.g., none meeting a minimum distance threshold), a different method of estimating the fingertip location may be used. At this point, the foreground object is assumed to have a single touch location. Typically, this will correspond to a finger in the sensed field of view but it could also represent a closed hand or other object used for gesturing.

In this case, the assertion is made that any valid gesturing object will extend into the imaged plane from a position outside of the rectangular pixel grid. The tip will then be the farthest point from the intersection of the object and the grid boundary pixels.

A practical way to identify the fingertip location 2510 based on this principle is to first identify the contour points that fall on the boundary edge of the image grid. A boundary reference point 2520 can then be established by ordering the contour edge points and taking the coordinate of the median index of the set. Note that this ordering and indexing is performed in a one dimensional sense about the perimeter of the pixel grid so that an object spanning both x and y axis edges still has a valid reference point. Once the boundary reference point is established, the fingertip location 2510 is defined as the contour point who's coordinate is farthest (Euclidian norm) from that of the reference point 2520.

Once the coarse 2D fingertip positions (x,y) have been calculated, the touch locus of each finger and an area of the occlusion zone near the locus are determined to support the occlusion-based height estimation. In some embodiments, surface occlusion codes in the area of the finger local to the fingertip coordinate are identified, and then the touch locus is identified. Various tradeoffs exist when determining how large of an occlusion area to use when estimating height. Too little of an area and signal to noise ratio (SNR) relative to height estimation will suffer as there will not be enough of an averaging effect. Too large of an area and occlusion codes representing positions nearer to the knuckle will start to bias the height estimate away from the surface and create high variability in the estimate based on the incident angle of the finger during a touch.

When determining the fingertip area in which to perform surface occlusion height estimation, it may be useful to smooth the contour upon which each fingertip coordinate lies. A spline fit may used to sufficiently reduce quantization noise in the contour while retaining the same basic shape. This smoothed contour can then be used for curvature analysis.

Figure 26:
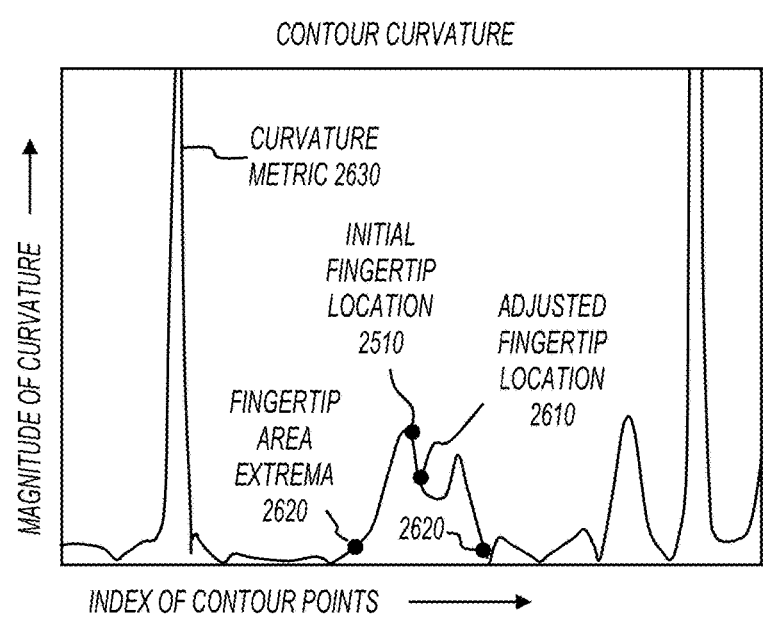
FIG. 26 shows a plot of a contour curvature metric and points of interest in accordance with various embodiments of the present invention.
Figure 27:
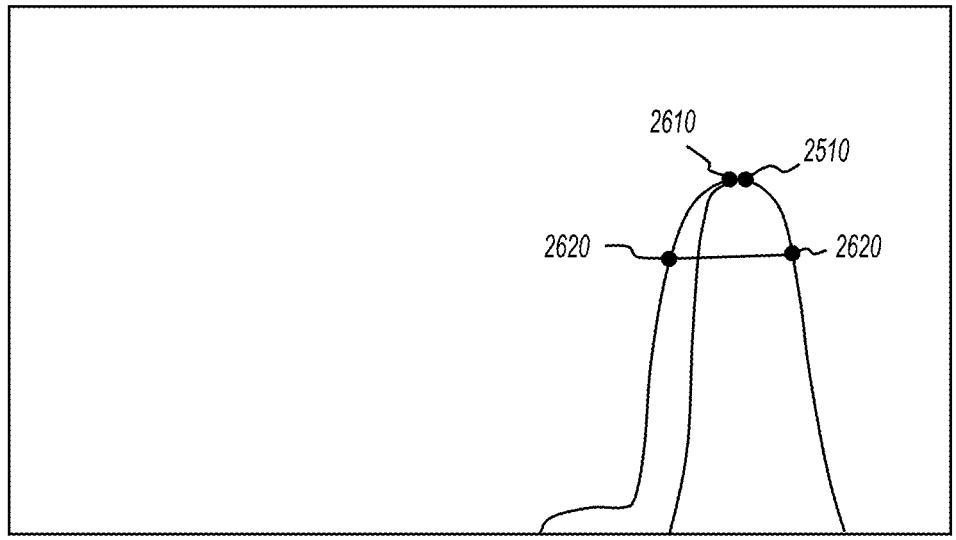
FIG. 27 shows a 2D representation of a finger with the points of interest from FIG. 26 identified in accordance with various embodiments of the present invention.

In some embodiments, a curvature metric is utilized for determining when the finger contour becomes sufficiently flat, marking the sides of the finger surrounding the fingertip. An example extrinsic curvature equation:

$$|k| = \left| \frac{x'y'' - y'x''}{(x'^2 + y'^2)^{\frac{3}{2}}} \right| \tag{7}$$

may be evaluated at all points along the finger. An example plot of the contour curvature metric 2630 and points of interest are shown in FIG. 26. An example 2D representation of a finger with the points of interest is shown in FIG. 27.

Starting from the initial fingertip location, the contour indices are traversed in each direction until the curvature metric falls below some configurable value. These two points of curvature extrema 2620 are used as start and end points forming a new contour that encloses the fingertip area. The median index between the points is also recorded as a refined fingertip location 2610. A min and max arc length is specified during traversal to limit fingertip area variance for outlier contour shapes.

In other embodiments, a curve or line is fit to the occlusion on the edge of a finger to project the actual point of contact. This may help substantially for fingers at a high 'angle of attack' touching the background surface.

Note that while the surface occlusion width is significantly large at the base of the finger, it narrows as the fingertip is approached and occlusion codes are mostly absent from the contoured fingertip area. This makes sense since the captured image corresponds to a touch event.

Figure 28:
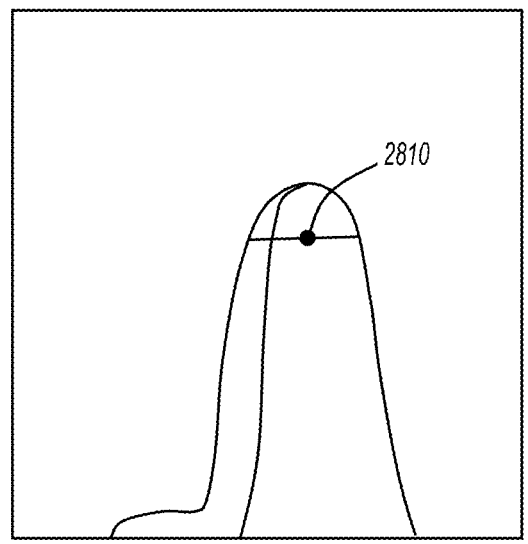
FIG. 28 shows an identified touch locus on a foreground object in accordance with various embodiments of the present invention.

Using the refined fingertip location and the associated fingertip area, an x,y coordinate representing the contact point of the finger can be calculated. One relatively simple method of computing this point is to traverse the fingertip contour a fixed arc length in each direction from the tip point and mark the touch locus at the bisection point. This coordinate represents a better estimate of a user's intended touch location on the 2D projection plane. This is shown in FIG. 28 where locus 2810 is identified.

At heights well above the projection plane, the surface occlusion area inside the contour will significantly bias the computed touch location along the axis of disparity, but as the height converges to zero for a touch event, the bias also converges to zero. Some embodiments accept this bias as a practical tradeoff in lieu of more complex calculations that mitigate bias but add little functional benefit.

Figure 29:
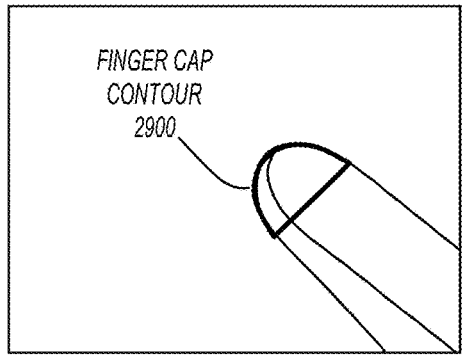
FIG. 29 shows an identified finger cap contour in accordance with various embodiments of the present invention.

FIG. 29 shows an identified finger cap contour in accordance with various embodiments of the present invention. In order to isolate the occlusion codes in the fingertip area, the enclosing finger cap contour 2900 is extended to form a surface occlusion mask. Using this mask, the occluded area can be computed, along with the height of the mask along the opposite axis from that of the sensor disparity. Dividing the area by the height yields an average surface occlusion width in the area local to the fingertip. This occlusion width information will then be used to estimate the finger height above the surface.

In some embodiments, a mask defined by the area inside the finger cap contour alone is insufficient for these computations as it does not guarantee that the isolated occlusion codes are properly accumulated along the axis of disparity.

Some embodiments convert from a finger cap contour to a surface occlusion mask using the following steps:

1. Identify the contour endpoint closest to the occluded area;
2. Change the y-value of the other endpoint to that of the closest;
3. Remove any contour points that are now outside of the intersection of the new endpoints; and
4. Flood fill the resulting contour onto an image-sized array of zeros to yield a binary mask.

Figure 30:
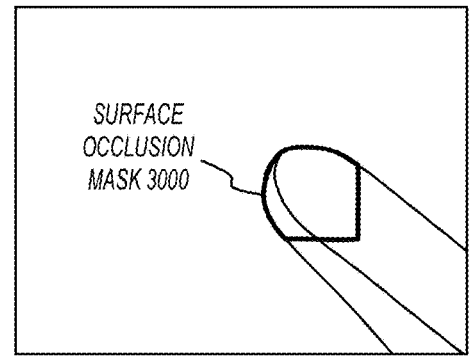
FIG. 30 shows an identified surface occlusion mask in accordance with various embodiments of the present invention.

FIG. 30 shows an identified surface occlusion mask 3000 generated from finger cap contour 2900 using the above steps.

Computing the surface occlusion width is very straightforward once the surface occlusion mask has been obtained. To find the average width of our 2D shape, the area is integrated and divided by the height. The height is defined as the maximum extent of the surface occlusion mask in the y-plane. The area is found by summing the number of pixels inside the mask that exceed the occlusion code threshold. This threshold is chosen based on the tri-modal distribution of the returned illumination data histogram such that the occlusion codes are isolated from the foreground and background codes.

Occlusion code thresholds may be different depending on the type of returned illumination data is used to distinguish the occlusion from the foreground object and the background surface. This is illustrated in FIGS. 31-33.

Figure 31:
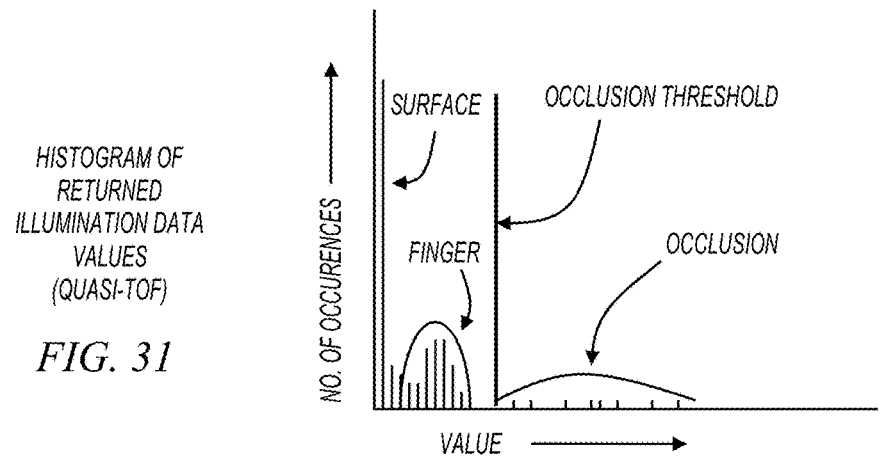
FIG. 31 shows an occlusion threshold in a histogram of quasi-TOF data as returned illumination data in accordance with various embodiments of the present invention.

FIG. 31 shows an occlusion threshold in a histogram of quasi-TOF data as returned illumination data in accordance with various embodiments of the present invention. The occlusion threshold in FIG. 31 is chosen to lie between the mode that represents the finger and the higher codes that represent the occlusion. In these embodiments, codes higher than the threshold are considered to be occlusion codes.

Figure 32:
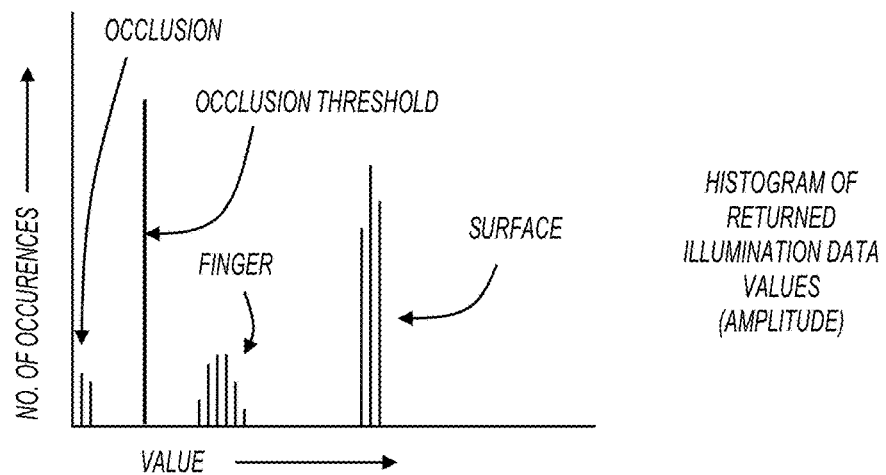
FIG. 32 shows an occlusion threshold in a histogram of amplitude data as returned illumination data in accordance with various embodiments of the present invention.

FIG. 32 shows an occlusion threshold in a histogram of amplitude data as returned illumination data in accordance with various embodiments of the present invention. The occlusion threshold in FIG. 32 is chosen to lie between the mode that represents the finger and the lower codes that represent the occlusion. In these embodiments, codes lower than the threshold are considered to be occlusion codes.

Figure 33:
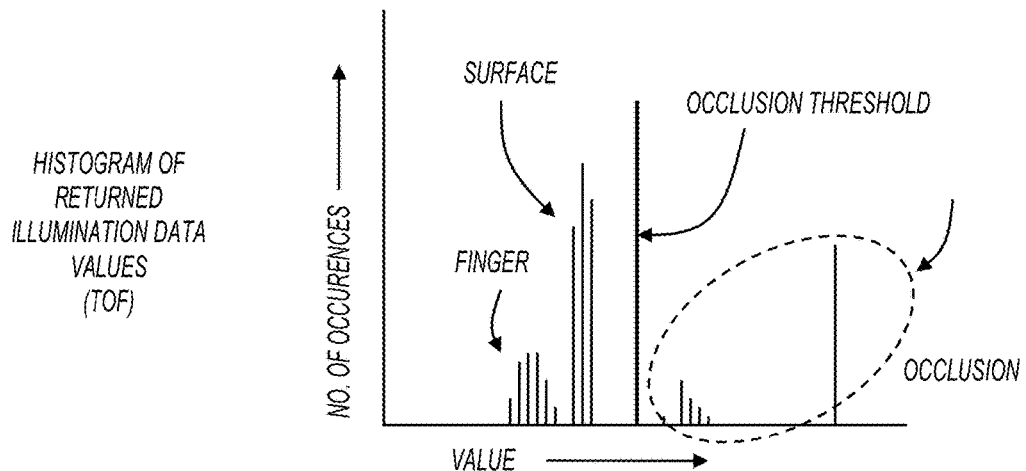
FIG. 33 shows an occlusion threshold in a histogram of TOF data as returned illumination data in accordance with various embodiments of the present invention.

FIG. 33 shows an occlusion threshold in a histogram of TOF data as returned illumination data in accordance with various embodiments of the present invention. The occlusion threshold in FIG. 33 is chosen to lie between the mode that represents the background surface and the higher codes that represent the occlusion. In these embodiments, codes higher than the threshold are considered to be occlusion codes.

Figure 34:
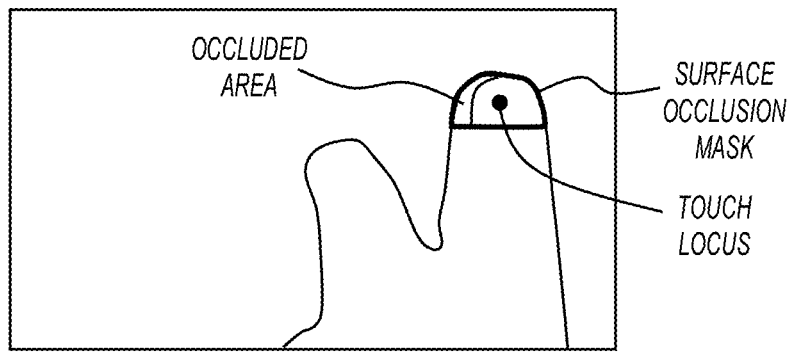
FIGS. 34 and 35 show surface occlusion masks and occluded areas for two different finger heights above a background surface in accordance with various embodiments of the present invention.
Figure 35:
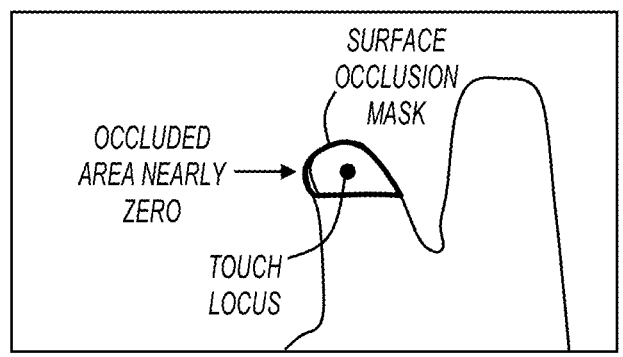

FIGS. 34 and 35 show surface occlusion masks and occluded areas for two different finger heights above a background surface in accordance with various embodiments of the present invention. FIG. 34 shows one finger as being some distance above the surface plane, while FIG. 35 shows a different finger exhibiting a touch event.

Occlusion-Based Height Estimation

The average width of the surface occlusion in the region local to the fingertip is directly proportional to the height above the surface. Accordingly, some embodiments perform finger height estimation by simply comparing the width of the occlusion to various thresholds representing different heights. Further, some embodiments may pass the calculated occlusion width directly on to gesture layers including touch detectors utilizing width thresholds.

In reality, the surface occlusion width will vary not just based on height but also on angle relative to the TX/RX disparity axis. This occurs because of the geometric relationship producing the surface occlusion formed by the intersection of the transmit and receive angles.

If the transmit scan angles are known as well as the fixed position of the ToF measurement components relative to each other and to the surface plane, then the height of the finger (z) may be calculated in terms of actual distance units (mm, inches, etc). This is described above with reference to FIGS. 6 and 7.

In some embodiments, the results of the occlusion-based height estimation are averaged to reduce error. Referring now back to FIG. 6, error computations follow.

Given that $$\beta = \frac{\pi}{2} + e_\beta, \tag{8}$$

$$\theta = 0, \tag{9}$$

and $$\alpha = \frac{\pi}{2} + e_\alpha, \tag{10}$$

x can be represented as $$x = h - \frac{d\cos(e_\beta)\cos(e_\alpha)}{-\cos(e_\beta)\sin(e_\alpha) + \left(\frac{d}{h}\cos(e_\beta) + \sin(e_\beta)\right)\cos(e_\alpha)} \quad (11)$$

and the error in x can be represented as $$e_x = h - \frac{h}{1 + \frac{h}{d}(e_\beta - e_\alpha)}. \quad (12)$$

To get an expression for the estimator bias or statistical expected value we assume that the error has a uniform distribution. The expected value of the error can be shown as $$E\{e_x\} = h - hE\left\{\frac{1}{1 + \frac{h}{d}(e_\beta - e_\alpha)}\right\} \quad (13)$$

$$\frac{1}{2e_{max}} \int_{-e_{max}}^{e_{max}} \frac{1}{1 + cx} dx = \frac{1}{2e_{max}c} \log\left(\frac{1 + ce_{max}}{1 - ce_{max}}\right) \quad (14)$$

$$E\{e_x\} = h - \frac{d}{2e_{max}} \log\left(\frac{d + he_{max}}{d - he_{max}}\right) \quad (15)$$

To provide a more concrete example of the error analysis, assume h is 15 inches, d is 1.5 inches, and the max value for either $e_\beta$ or $e_\alpha$ is (52 degrees/150 points) or 0.006 radians. Using equation (13), $e_{x,max}$=0.84 inches. If the target error $e_{x,target}$=0.1 inches, then averaging 64 height estimations will provide the desired accuracy.

$$N_{avg} = \left(\frac{e_{x,max}}{e_{x,target}}\right)^2 = 64 \quad (16)$$

Averaging can be factored into temporal averaging and spatial averaging:

$$N_{avg} = N_{avg,time} \times N_{avg,space} \quad (17)$$

Spatial averaging can be accomplished using multiple vertical points along the finger. Temporal averaging can be accomplished using points from subsequent frames. Alternately, the number of illumination points may be increased in each line to increase the number of returned illumination points available for spatial averaging in each frame.

Finger 3D Position

At this point in the image processing chain, each finger has been identified with an associated height above the plane (z value) and an x,y touch locus on the projection plane. When the finger is touching the surface, the x,y position is relatively accurate. However, for fingers above the projection plane, the x,y position includes an error based on the geometric properties of the projector. Some embodiments accept this error, as it only occurs when the touch locus is away from the projection surface. Some embodiments correct for this error by back-calculating the correct x,y position based on the same geometric properties described above with reference to earlier figures.

Figure 36:
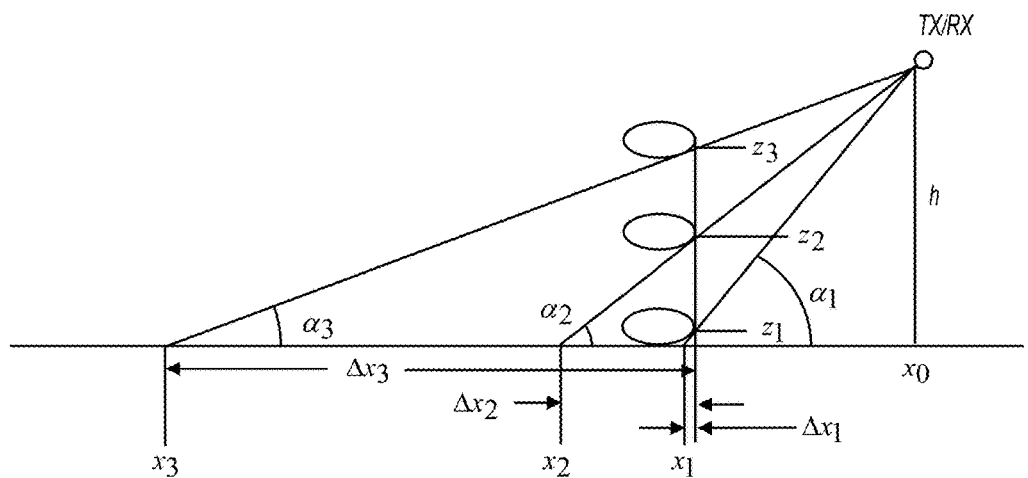
FIG. 36 shows Cartesian position correction for an axis without sensor disparity in accordance with various embodiments of the present invention.

This is illustrated most simply along the axis without sensor disparity as shown in FIG. 36, where the variable 'x' is generic and does not necessarily represent the horizontal axis.

One can see that the edge of a finger at the same x value normal to the plane produce different planar projections (x1, x2, x3) depending on the height above the plane. The projection bias ($\Delta x$) can be easily found using the relation of similar triangles:

$$\tan(\alpha) = \frac{h}{x} = \frac{z}{\Delta x} \Rightarrow \Delta x = \frac{x * z}{h}. \quad (18)$$

Figure 37:
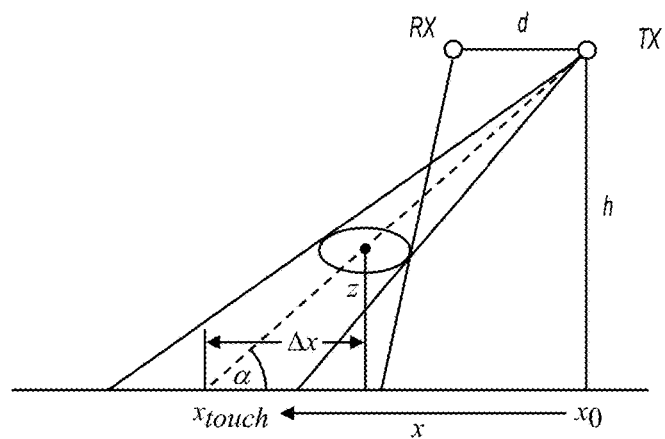
FIG. 37 shows Cartesian position correction for an axis with sensor disparity in accordance with various embodiments of the present invention.

Likewise, the same calculation can be performed along the axis with sensor disparity as shown in FIG. 37 using the touch locus rather than the finger edge.

The final 3D coordinate then can be found by the following means:

1. Identify the transmit angles associated with the x,y coordinates of the touch locus projected on the surface plane;
2. Back calculate the projection biases $\Delta x$ and $\Delta y$; and
3. Subtract off the biases from the touch locus coordinate and combine with the height measure to arrive at the final x,y,z position of the finger.

Because the various embodiments of the present invention can determine the 3D position of pointers in the field of view, mid-air gesture recognition is made possible. It is not necessary that the pointer break an IR plane located very near the projection surface as in the prior art.

Finger Tracking and Touch State

In some embodiments, instantaneous 3D position estimates are further temporally filtered before presenting to operating system (OS) gesture application programming interfaces (APIs). Further, some embodiments include an intermediate tracking layer to reduce positional jitter and provide optional hysteresis and thresholding functions for evaluating touch and gesture state.

The Kalman filter is a natural fit for handling the filtering operation, with each finger position employing two elements of the state transition matrix: one for the position and other for its velocity estimate. Some embodiments include an association algorithm prior to Kalman filtering to ensure that instantaneous 3D positions obtained each frame from the image processing chain are evaluated with the same absolute index. One such algorithm that can be used to turn an unordered set of instantaneous points into the same ordering as a set of previously tracked points is the Munkres assignment algorithm.

A summarized procedure for implementing the tracking layer is as follows:

1. Obtain an unordered set of 3D finger points based on the current frame of processed data;
2. Associate these points with any existing tracked points from previous frames;
3. For any (non-associated) new points, create new Kalman tracking objects and add to ordered list;
4. Remove any tracking objects from the ordered list that no longer meet the association persistence criteria;
5. Perform Kalman updates;
6. Evaluate updated position estimates and send x,y coordinates to OS gesture API for fingers meeting touch threshold criteria; and
7. Optionally, send other events (keyboard/mouse bindings) to OS based on 3D gesture patterns.

In some embodiments, touch interactivity arises from tracking a 3D location estimate over time in the same coordinate system as the light (IR or visible+IR) projected on the background surface. For example, with live video at 720p, a finger touch locus may be tracked over (1280, 720, z) with touch events being sent to the OS when z sufficiently approaches zero.

Touch can be thought of as a subset of gestures where the 2D planar classification is a finger-like object that activates at an (x,y) coordinate when the height (z) sufficiently approaches zero. In some embodiments, many different foreground shapes are tracked for touch and gesture recognition. For example, some embodiments track a flat palm or first or any other discernable shape in 3D space and can be made to activate a key/mouse/gesture-binding (ex. Windows key) when some trajectory is followed at some height (e.g., enters left field of view and exits right field of view while remaining above "touch" height).

In some embodiments, temporal averaging, velocity tracking, and existence and persistence heuristics are applied to frame-over-frame updates of the position estimates to track foreground objects in 3D space over time, thereby achieving robust interactivity.

Embodiments described thus far include a single receiver which results in occlusions appearing on one side of a foreground object. Various embodiments of the present invention include projection apparatus having two or more receivers to produce occlusions on more than one side of foreground objects. One such embodiment is shown in FIG. 38.

Figure 38:
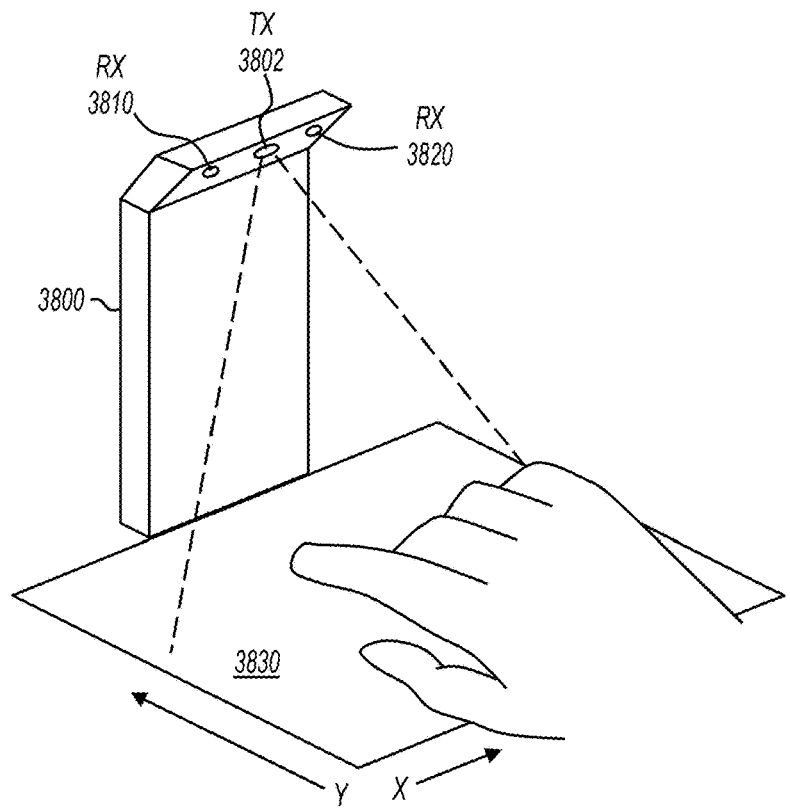
FIG. 38 shows a projection apparatus with two receivers in accordance with various embodiments of the present invention.

FIG. 38 shows a projection apparatus with two receivers in accordance with various embodiments of the present invention. FIG. 38 shows projection apparatus 3800 having transmitter 3802 and receivers 3810 and 3820 on opposing sides of transmitter 3802. Transmitter 3802 and receivers 3810 and 3820 are shown in a line providing TX/RX disparity in a single dimension, but this is not a limitation of the present invention. For example, in some embodiments, receiver 3810 is positioned as shown to provide TX/RX disparity in the x dimension, and receiver 3820 is positioned above transmitter 3802 to provide TX/RX disparity in the y dimension. Projection apparatus 3800 is shown projecting content including IR illumination pulses on projection surface 3830.

Figure 39:
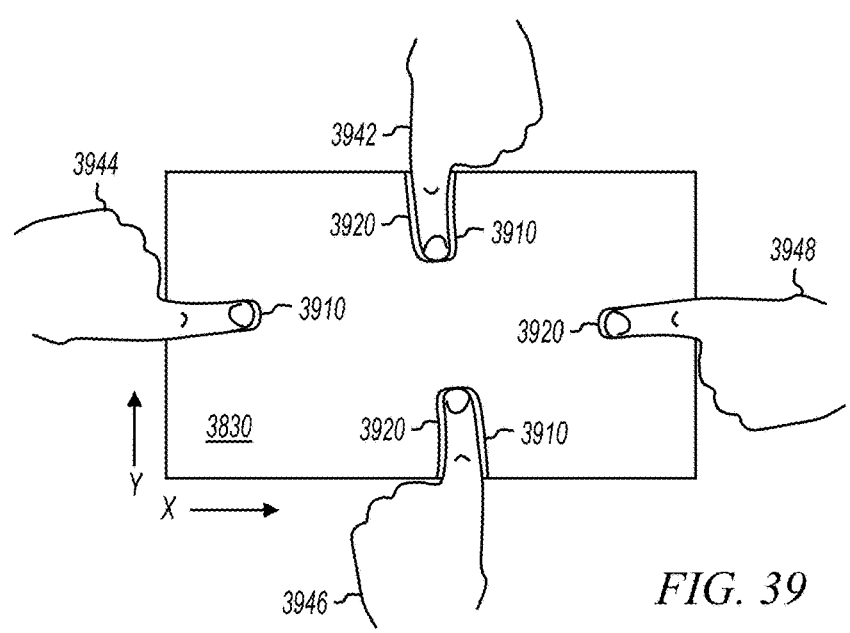
FIG. 39 shows occlusion regions resulting from operation of the projection apparatus of FIG. 38 in accordance with various embodiments of the present invention.

FIG. 39 shows occlusion regions resulting from operation of the projection apparatus of FIG. 38 in accordance with various embodiments of the present invention. FIG. 39 shows four foreground objects 3942, 3944, 3946, 3948 entering the field of view from four different directions. Because projection apparatus 3800 includes two receivers, each foreground object in FIG. 39 results in at least one occlusion region. For example, receiver 3810 detects occlusion regions 3910 for objects 3942, 3944, and 3946, and receiver 3820 detects occlusion regions 3920 for objects 3942, 3946, and 3948.

Various embodiments utilize the multiple occlusion regions for occlusion-based height estimation as described further below. For example, FIG. 40 shows two parallel paths for processing returned illumination data from two receivers, and FIG. 41 shows a combined processing path for processing returned illumination data from two receivers.

Figure 40:
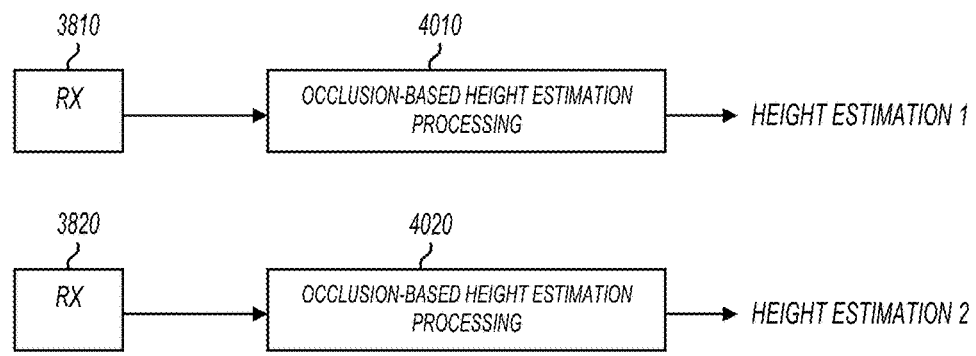
FIG. 40 shows parallel occlusion-based height estimation in accordance with various embodiments of the present invention.

FIG. 40 shows parallel occlusion-based height estimation in accordance with various embodiments of the present invention. The system of FIG. 40 includes occlusion-based height estimation processing 4010 and occlusion-based height estimation 4020. Occlusion-based height estimation processing 4010 and 4020 each include circuits and systems described above that can receive returned illumination data from a receiver and perform occlusion-based height estimation. The result is two separate height estimations for some foreground objects. For example, both 4010 and 4020 will create height estimates for objects 3942 and 3946, whereas only 4010 will create a height estimate for object 3944 and only 4020 will create a height estimate for object 3948.

In some embodiments, receivers 3810 and 3820 collect returned illumination data for alternate scan lines. For example, receiver 3810 may collect returned illumination data for even lines and receiver 3820 may collect returned illumination data for odd lines. If both processing paths provide occlusion data, the results may be averaged. If only one processing path provides occlusion data, then the height estimation from that path may be used separately.

Figure 41:
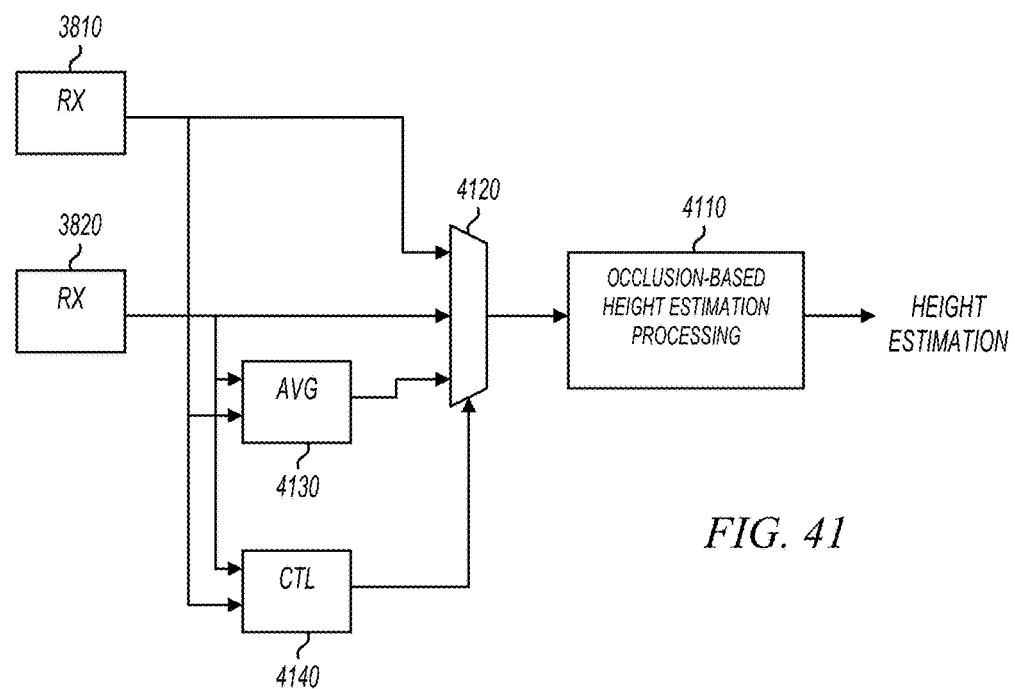
FIG. 41 shows conditional averaging of returned illumination data in accordance with various embodiments of the present invention.

FIG. 41 shows conditional averaging of returned illumination data in accordance with various embodiments of the present invention. The system of FIG. 41 includes a single occlusion-based height estimation processing block 4110 that receives returned illumination data from one of three different sources based on the operation of multiplexer 4120. For example, returned illumination data may be provided by receiver 3810, receiver 3820, or by averaging circuit 4130 which averages the returned illumination data from the two receivers.

In operation, control circuit 4140 receives the returned illumination data from the two receivers and determines which of the three different sources will provide returned illumination data to the occlusion-based height estimation. In some embodiments, the average is used when no occlusion is detected by either receiver, and if an occlusion is detected, the receiver that detects the occlusion is selected to provide the returned illumination data. Control circuit 4140 may include any circuit elements capable of performing the function described. For example, control circuit 4140 may include digital logic such as comparators.

Averaging the returned illumination data when there is no occlusion provides an increase in SNR for measurements representing background and foreground objects. In some embodiments, averaging circuit 4130 provides a weighted average and/or classification-based merging of the data streams. For example, in some embodiments, averaging circuit 4130 evenly averages the two data stream in the case of two low codes and provides a weighted average for other codes. In these embodiments, the system of FIG. 41 may preserve occlusion codes when they are present in either stream, evenly average the streams in the case of two low codes and determines a weighted average in between. The weighted average may follow a gradient based on the code values.

Figure 42:
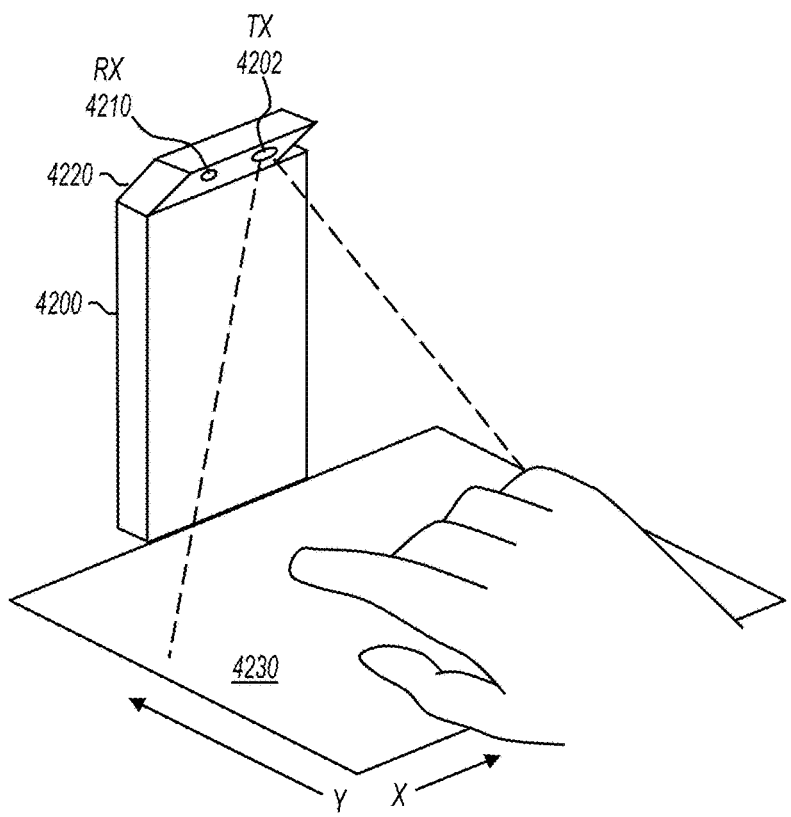
FIG. 42 shows a projection apparatus with a swing arm in accordance with various embodiments of the present invention.

FIG. 42 shows a projection apparatus with a swing arm in accordance with various embodiments of the present invention. Projection apparatus 4200 includes transmitter 4202 and receiver 4210 mounted on swing arm 4220. Swing arm 4220 is shown in the "retracted" position which results in TX/RX disparity in the x dimension. Projection apparatus 4200 is shown projecting content including IR illumination pulses on projection surface 4230.

In some embodiments, when the swing arm is retracted and the sensors are in horizontal alignment, the projector is in a "wall mode" projection, where the projector may be in a "projection-only" mode or where mid-range touch and gesture sensing are performed. Similarly, extending the arm into the vertical configuration would may switch the projector into "short throw" or "tabletop interaction" mode where short-range touch and gesture sensing are performed.

Figure 43:
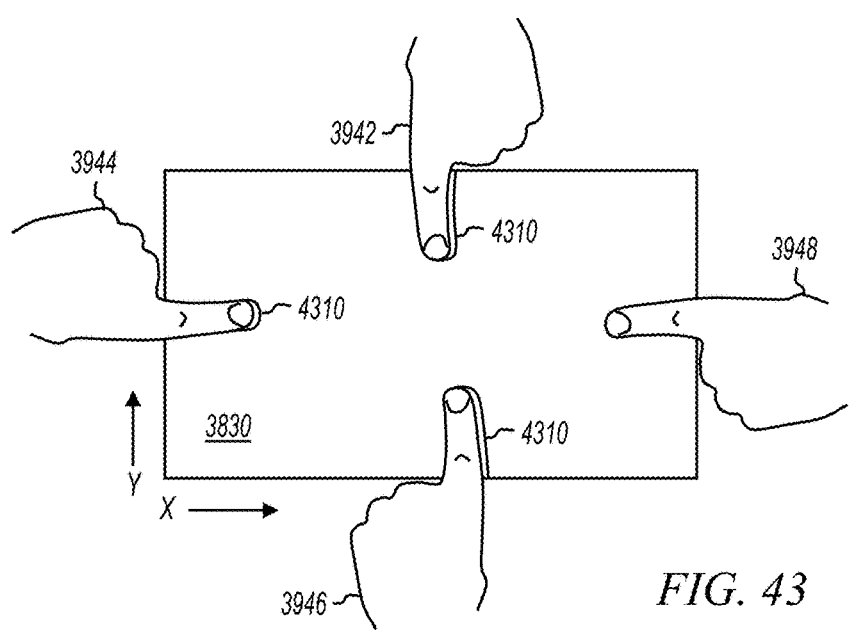
FIG. 43 shows occlusion regions resulting from operation of the projection apparatus of FIG. 42 in accordance with various embodiments of the present invention.

FIG. 43 shows occlusion regions resulting from operation of the projection apparatus of FIG. 42 in accordance with various embodiments of the present invention. Because of the TX/RX disparity in the x dimension with the swing arm retracted, receiver 4210 detects occlusions 4310 for foreground objects 3942, 3944, and 3946, but not for foreground object 3948.

Figure 44:
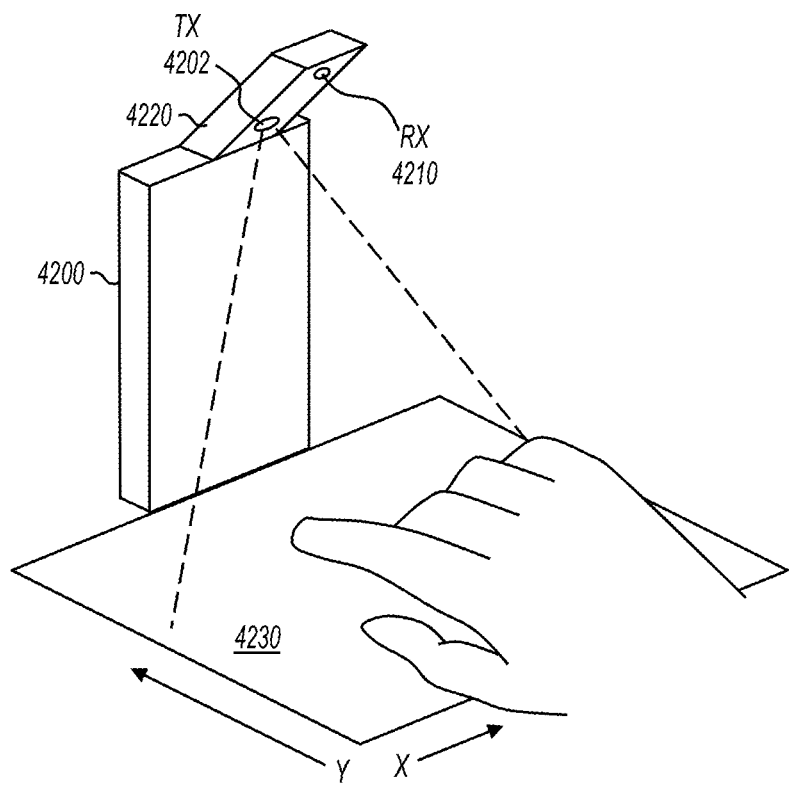
FIG. 44 shows the projection apparatus of FIG. 42 with an extended swing arm in accordance with various embodiments of the present invention.

FIG. 44 shows the projection apparatus of FIG. 42 with an extended swing arm in accordance with various embodiments of the present invention. As shown in FIG. 44, swing arm 4220 has been rotated 90 degrees into an extended position. When swing arm 4220 is extended, receiver 4210 rotates with respect to transmitter 4202. FIG. 44 shows transmitter 4202 mounted on swing arm 4220 in a manner that implies the transmitter is rotated when the swing arm is extended, but this is not a limitation of the present invention. For example, in some embodiments, transmitter 4202 is mounted in a manner such that the transmitter does not rotate when the swing arm is extended. This preserves the absolute orientation of the transmitter, thereby allowing the same coordinate system to be used for returned illumination data regardless of the state of the swing arm.

Figure 45:
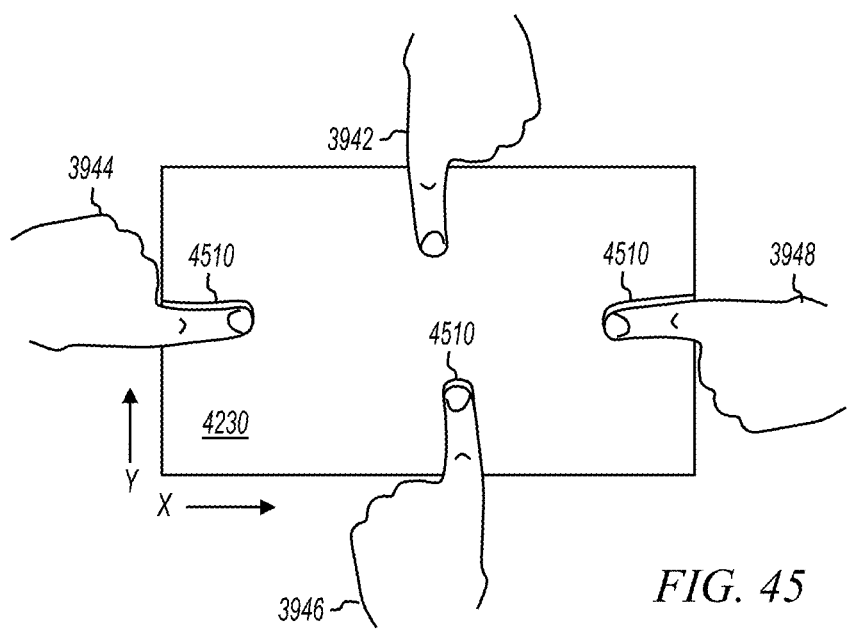
FIG. 45 shows occlusion regions resulting from operation of the projection apparatus of FIG. 45 in accordance with various embodiments of the present invention.

FIG. 45 shows occlusion regions resulting from operation of the projection apparatus of FIG. 44 in accordance with various embodiments of the present invention. Because of the TX/RX disparity in the y dimension with the swing arm extended, receiver 4210 detects occlusions 4510 for foreground objects 3944, 3946, and 3946, but not for foreground object 3942.

Various embodiments of the present invention orient the receiver relative to the transmitter in a manner that increases the resolution of returned illumination data in occlusion zones. For example, as described above, the transmitter may include a scanning laser projector that sweeps a modulated light beam in a raster pattern in two dimensions. The number of lines in the raster pattern determines the resolution in one dimension and the number of light pulses in a line determines the resolution in a second dimension. As an example, a 1280×720 display may be created by sweeping a light beam in a raster pattern with 720 lines in the y dimension and modulating the light beam 1280 times per line in the x dimension. Although a visible light beam may be modulated 1280 times per line, a nonvisible light beam used for IR illumination data may be modulated at a lower frequency (e.g., 150 times per line). In these embodiments, the returned illumination data has a higher resolution in the y dimension, even though the visible image has a higher resolution in the x dimension.

TX/RX disparity may be chosen to be on the axis that will provide higher resolution. For example, in the example above, TX/RX disparity may be provided in they dimension to take advantage of the 720 lines rather than the 150 light pulses per line. In other embodiments, where the number of light pulses per line exceeds the number of lines, TX/RX disparity may be provided in the x direction.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
emitting light pulses in a field of view from a directional light transmitter;
receiving light pulse reflections from a foreground object and a background surface at an omni-directional light receiver;
measuring at least one property of the light pulse reflections to produce returned illumination data;
estimating a two-dimensional position on the illuminated surface using feature extraction of the foreground object from the imaged planar projection;
estimating a height of the foreground object relative to the background surface based on light pulse reflections occluded by the foreground object as:

$$k = h - \frac{d\sin(\beta)\sin(\alpha - \theta)}{\sin(\beta)\cos(\alpha) + \left(\frac{d}{h}\sin(\beta - \theta) - \cos(\beta)\right)\sin(\alpha)} - r - r\cos(\gamma + \theta),$$

where:
k is a height estimate;
β is an angle of an occlusion edge;
α is an angle of an edge of the foreground object;
θ is an angle between the light transmitter to the light receiver and the light transmitter to the background surface;
h is a height of the light transmitter above the background surface;
d is a distance between the light transmitter and the light receiver;
r is a radius of the foreground object; and $$\gamma = \tan^{-1}\left(\frac{h\sin(\beta)}{d\sin(\beta - \theta) - h\cos(\beta)}\right);$$

and determining a three dimensional location of the foreground object as a function of the two-dimensional position estimate, the height estimate and the angular geometry relative to the light transmitter.

2. The method of claim 1 wherein measuring at least one property comprises measuring a time of flight.

3. The method of claim 2 wherein the time of flight measurements of light pulses reflected off the foreground object are separable from the time of flight measurements of light pulses reflected off the background surface because of reflectivity differences between the foreground object and the background surface.

4. The method of claim 1 wherein measuring at least one property comprises measuring an amplitude.

5. The method of claim 4 wherein the amplitude measurements of light pulses reflected off the background surface are separable from the amplitude measurements of light pulses reflected off the foreground object because of reflectivity differences between the foreground object and the background surface.

6. The method of claim 1 wherein measuring at least one property comprises measuring an amplitude and a time of flight.

7. The method of claim 6 further comprising generating a corrected time of flight as a function of the measured time of flight and measured amplitude, and generating the returned illumination data from the corrected time of flight.

8. The method of claim 1 further comprising prior to estimating a location in 3D space performing spatial transforms on the returned illumination data to create a two dimensional projection normal to the background surface.

9. The method of claim 1 further comprising prior to estimating a location in 3D space combining a region in the returned illumination data representing occluded light pulse reflections with a region in the returned illumination data representing light pulse reflections from the foreground object; and performing edge detection to detect an outline of the foreground object.

10. The method of claim 1 further comprising prior to estimating a location in 3D space, determining a touch locus of the foreground object, and wherein estimating comprises estimating a 3D location of the foreground object with respect to the background surface based on a width of an occlusion region in a vicinity of the touch locus.

11. The method of claim 1 further comprising registering a touch event when the three dimensional location is sufficiently close to the background surface.

12. The method of claim 1 further comprising tracking the three dimensional location over multiple frames to recognize gestures in 3D space.

13. An apparatus comprising:
- a directional light transmitter to emit light pulses in a field of view;
- an omni-directional light receiver to receive reflections of the light pulses from a foreground object and a background surface in the field of view;
- a time of flight measurement circuit to measure a time of flight of the reflections of the light pulses to produce returned illumination data; and
- a processing circuit to estimate a two-dimensional position on the illuminated surface using feature extraction of the foreground object from the imaged planar projection, to estimate a height of the foreground object relative to the background surface based on light pulse reflections occluded by the foreground object, and to determine a three dimensional location of the foreground object as a function of the two-dimensional position estimate, the height estimate and the angular geometry relative to the light transmitter;
- wherein the height of the foreground object relative to the background surface is estimated as:

$$k = h - \frac{d\sin(\beta)\sin(\alpha - \theta)}{\sin(\beta)\cos(\alpha) + \left(\frac{d}{h}\sin(\beta - \theta) - \cos(\beta)\right)\sin(\alpha)} - r - r\cos(\gamma + \theta),$$

where:
- k is the height estimate;
- β is an angle of an occlusion edge;
- α is an angle of an edge of the foreground object;
- θ is an angle between the light transmitter to the light receiver and the light transmitter to the background surface;
- h is a height of the light transmitter above the background surface;
- d is a distance between the light transmitter and the light receiver;
- r is a radius of the foreground object; and $$\gamma = \tan^{-1}\left(\frac{h\sin(\beta)}{d\sin(\beta - \theta) - h\cos(\beta)}\right).$$

14. The apparatus of claim 13 wherein the processing circuit registers a touch event when the three dimensional location is sufficiently close to the background surface.

15. The apparatus of claim 13 wherein the processing circuit tracks the three dimensional location over multiple frames to recognize gestures in 3D space.

16. An apparatus comprising:
- a directional light transmitter to emit light pulses in a field of view;
- an omni-directional light receiver to receive reflections of the light pulses from a foreground object and a background surface in the field of view;
- an amplitude measurement circuit to measure an amplitude of the reflections of the light pulses to produce returned illumination data; and
- a processing circuit to estimate a two-dimensional position on the illuminated surface using feature extraction of the foreground object from the imaged planar projection, to estimate a height of the foreground object relative to the background surface based on light pulse reflections occluded by the foreground object, and to determine a three dimensional location of the foreground object as a function of the two-dimensional position estimate, the height estimate and the angular geometry relative to the light transmitter;
- wherein the height of the foreground object relative to the background surface is estimated as:

$$k = h - \frac{d\sin(\beta)\sin(\alpha - \theta)}{\sin(\beta)\cos(\alpha) + \left(\frac{d}{h}\sin(\beta - \theta) - \cos(\beta)\right)\sin(\alpha)} - r - r\cos(\gamma + \theta),$$

where:
- k is the height estimate;
- β is an angle of an occlusion edge;
- α is an angle of an edge of the foreground object;
- θ is an angle between the light transmitter to the light receiver and the light transmitter to the background surface;
- h is a height of the light transmitter above the background surface;
- d is a distance between the light transmitter and the light receiver;
- r is a radius of the foreground object; and $$\gamma = \tan^{-1}\left(\frac{h\sin(\beta)}{d\sin(\beta - \theta) - h\cos(\beta)}\right).$$

17. The apparatus of claim 16 further comprising a time of flight measurement circuit to measure a time of flight of the reflections of the light pulses.

18. The apparatus of claim 16 further comprising a time of flight correction circuit to produce a corrected time of flight based on the measured time of flight and the measured amplitude.

19. The apparatus of claim 16 wherein the processing circuit registers a touch event when the three dimensional location is sufficiently close to the background surface.

20. The apparatus of claim 16 wherein the processing circuit tracks the three dimensional location over multiple frames to recognize gestures in 3D space.

21. An apparatus comprising:
- a directional light transmitter to emit light pulses in a field of view;
- an omni-directional light receiver to receive reflections of the light pulses from a foreground object and a background surface in the field of view;

a time of flight measurement circuit to measure a time of flight of the reflections of the light pulses to produce returned illumination data;

means for estimating a two-dimensional position on the illuminated surface using feature extraction of the foreground object from the imaged planar projection;

means for estimating a height of the foreground object relative to the background surface based on light pulse reflections occluded by the foreground object as a function of positional disparity between the light transmitter and the light receiver; and means for determining a three dimensional location of the foreground object as a function of the two-dimensional position estimate, the height estimate and the angular geometry relative to the light transmitter.

22. The apparatus of claim 21 further comprising means for registering a touch event when the three dimensional location is sufficiently close to the background surface.

23. The apparatus of claim 21 further comprising means for tracking the three dimensional location over multiple frames to recognize gestures in 3D space.

24. An apparatus comprising:

a directional light transmitter to emit light pulses in a field of view;

an omni-directional light receiver to receive reflections of the light pulses from a foreground object and a background surface in the field of view;

an amplitude measurement circuit to measure an amplitude of the reflections of the light pulses to produce returned illumination data;

means for estimating a two-dimensional position on the illuminated surface using feature extraction of the foreground object from the imaged planar projection;

means for estimating a height of the foreground object relative to the background surface based on light pulse reflections occluded by the foreground object as a function of positional disparity between the light transmitter and the light receiver; and means for determining a three dimensional location of the foreground object as a function of the two-dimensional position estimate, the height estimate and the angular geometry relative to the light transmitter.

25. The apparatus of claim 24 further comprising a time of flight measurement circuit to measure a time of flight of the reflections of the light pulses.

26. The apparatus of claim 24 further comprising a time of flight correction circuit to produce a corrected time of flight based on the measured time of flight and the measured amplitude.

* * * * *